United States Patent
Luo et al.

(10) Patent No.: US 12,160,923 B2
(45) Date of Patent: Dec. 3, 2024

(54) METHOD AND DEVICE FOR DETECTING PARTIAL DISCONTINUOUS TRANSMISSION (DTX) USING BITS RECONSTRUCTION

(71) Applicant: Hong Kong Applied Science And Technology Research Institute Co., Ltd., Shatin (HK)

(72) Inventors: Yaming Luo, Kowloon (HK); Man Wai Kwan, Shatin (HK); Xiangyu Liu, Guangdong (CN); Yanda Mou, Guangdong (CN); Kong Chau Tsang, Kowloon (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 413 days.

(21) Appl. No.: 17/680,727

(22) Filed: Feb. 25, 2022

(65) Prior Publication Data
US 2023/0276524 A1  Aug. 31, 2023

(51) Int. Cl.
*H04W 76/28* (2018.01)
*G06F 17/16* (2006.01)
(Continued)

(52) U.S. Cl.
CPC ............ *H04W 76/28* (2018.02); *G06F 17/16* (2013.01); *H04L 1/0058* (2013.01); *H04W 72/21* (2023.01)

(58) Field of Classification Search
CPC ..... H04W 76/28; H04W 72/04; H04W 72/21; H04W 72/23; H04W 24/02; H04W 24/08;
(Continued)

(56) References Cited

U.S. PATENT DOCUMENTS 7,418,063 B2 * 8/2008 Chen .................... H04B 7/2656
370/324
9,167,522 B2 * 10/2015 Das .................... H04W 52/0216
(Continued)

FOREIGN PATENT DOCUMENTS

CN      104168095 A    11/2014
CN      105491591 A     4/2016
(Continued)

*Primary Examiner* — Man U Phan
(74) *Attorney, Agent, or Firm* — GableGotwals

(57) ABSTRACT

Described is a method and device for detecting a DTX state at a UCI receiver in a wireless communication system. The method comprises receiving a linear block encoded signal on an uplink at said UCI receiver and processing the received signal after resource element (RE) demapping to generate a soft bit sequence $\vec{s}$. The method includes selecting a plurality of bits in said generated soft bit sequence $\vec{s}$ as comparison bits and comparing said selected comparison bits to corresponding bits in a reconstructed soft bit sequence $\vec{r}$. The reconstructed soft bit sequence $\vec{r}$ is generated from a plurality of bits selected as reconstruction bits in said generated soft bit sequence $\vec{s}$. A comparison or correlation metric is determined between the comparison bits and the corresponding bits in the reconstructed soft bit sequence $\vec{r}$, and a determination is made of the occurrence of a DTX state by evaluating the determined comparison or correlation metric.

18 Claims, 18 Drawing Sheets

(51) Int. Cl.
*H04L 1/00* (2006.01)
*H04W 72/21* (2023.01)

(58) Field of Classification Search
CPC ..... H04W 76/20; H04W 72/12; H04W 52/02; H04W 52/14; H04W 52/32; H04W 88/08; H04W 4/00; H04L 1/00; H04L 1/16; H04L 1/18; H04L 5/00; H04L 25/03; H04L 25/02; H04L 27/26; H04L 5/14; G06F 17/16
USPC ........................................................ 370/329
See application file for complete search history.

(56) References Cited

U.S. PATENT DOCUMENTS

| | | | |
|---|---|---|---|
| 9,357,537 B2* | 5/2016 | Hwang | H04W 52/0212 |
| 9,414,431 B2* | 8/2016 | Sandoi | H04W 76/28 |
| 9,756,620 B2* | 9/2017 | Yang | H04L 5/0053 |
| 9,948,442 B2* | 4/2018 | Han | H04L 27/2636 |
| 10,721,045 B2* | 7/2020 | Han | H04L 5/0023 |
| 10,772,153 B2* | 9/2020 | Guo | G06F 11/183 |
| 11,363,578 B2* | 6/2022 | Luo | H03M 13/136 |
| 11,375,486 B1* | 6/2022 | Luo | H04B 1/06 |
| 11,457,502 B2* | 9/2022 | Luo | H04W 72/0446 |
| 11,611,987 B2* | 3/2023 | Luo | H04L 5/0055 |
| 2003/0095507 A1 | 5/2003 | Chen et al. | |
| 2014/0286210 A1* | 9/2014 | Das | H04W 52/0229 370/311 |

FOREIGN PATENT DOCUMENTS

| | | |
|---|---|---|
| CN | 105847199 A | 8/2016 |
| CN | 108075862 A | 5/2018 |
| CN | 109983723 A | 7/2019 |
| WO | 2018090571 A1 | 5/2018 |

* cited by examiner

Correlation(s) ρ

If $\rho \leq$ Th ==> isDTX,
Else==> isDTX=0

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Fig. 19

| i | $R_{i,0}$ | $R_{i,1}$ | $R_{i,2}$ | $R_{i,3}$ | $R_{i,4}$ | $R_{i,5}$ | $R_{i,6}$ | $R_{i,7}$ | $R_{i,8}$ | $R_{i,9}$ |
|---|---|---|---|---|---|---|---|---|---|---|
| 0 | 6 | 0 | 0 | -3 | 3 | -6 | 3 | -3 | 3 | 0 |
| 1 | -3 | -3 | 12 | -6 | 6 | -3 | -9 | 6 | 0 | 3 |
| 2 | -3 | 0 | 6 | -3 | 0 | 0 | -3 | 6 | -3 | 3 |
| 3 | -2 | -1 | 7 | -4 | 2 | -3 | -5 | 7 | -1 | 3 |
| 4 | 3 | -3 | 3 | -6 | 3 | -6 | 3 | 0 | 3 | 3 |
| 5 | -1 | -2 | 5 | -5 | 4 | -3 | -4 | 5 | 1 | 3 |
| 6 | -2 | -4 | 10 | -7 | 5 | -3 | -8 | 7 | 2 | 3 |
| 7 | -2 | -4 | 13 | -10 | 5 | -6 | -5 | 7 | 2 | 3 |
| 8 | -3 | -3 | 9 | -6 | 6 | -6 | -6 | 6 | 3 | 3 |
| 9 | 4 | -1 | 4 | -7 | 5 | -9 | 1 | -2 | 5 | 3 |
| 10 | 5 | 1 | -4 | 1 | 1 | -3 | 5 | -7 | 4 | 0 |
| 11 | 2 | 1 | 2 | -2 | 1 | -3 | -1 | 2 | 1 | 0 |
| 12 | 3 | 0 | -3 | 0 | 0 | 0 | 6 | -3 | 0 | 0 |
| 13 | -1 | -2 | 5 | -2 | 1 | 3 | -4 | 5 | -2 | 0 |
| 14 | -6 | 0 | 3 | 3 | 0 | 6 | -6 | 6 | -3 | 0 |
| 15 | 1 | -1 | 4 | -4 | 5 | -6 | -2 | 1 | 2 | 3 |
| 16 | -4 | -2 | 11 | -5 | 1 | 0 | -7 | 8 | -2 | 3 |
| 17 | -7 | -2 | 11 | -2 | 1 | 3 | -10 | 11 | -5 | 3 |
| 18 | -2 | -4 | 10 | -7 | 5 | -3 | -5 | 4 | 2 | 3 |
| 19 | -6 | -3 | 9 | -3 | 3 | 0 | -6 | 6 | 0 | 3 |
| 20 | -9 | -3 | 12 | -3 | 3 | 3 | -12 | 12 | -3 | 3 |
| 21 | 8 | 1 | -4 | -2 | 1 | -6 | 8 | -7 | 4 | 0 |

Fig. 20

METHOD AND DEVICE FOR DETECTING PARTIAL DISCONTINUOUS TRANSMISSION (DTX) USING BITS RECONSTRUCTION

FIELD OF THE INVENTION

The invention relates particularly, but not exclusively, to an improved method and device for detection of discontinuous transmission (DTX) on an uplink (UL) at an uplink control information (UCI) receiver in a wireless communication network using bits reconstruction. The invention relates particularly to detection of partial DTX in small block encoded signals.

BACKGROUND OF THE INVENTION

In long-term evolution (LTE) communications systems, in a downlink (DL), a data payload is carried by transport blocks which are encoded into codewords which are sent over a DL physical data channel called the Physical Downlink Shared Channel (PDSCH). The scheduling information of the PDSCH codeword(s), including its resource allocation in the subframe and its modulation and coding scheme, is included in the physical control channel, called the Physical Downlink Control Channel (PDCCH). Generally, the receiving user equipment (UE) decodes the messages in PDCCH and, where it finds that a PDSCH has been assigned to it, it decodes the PDSCH codeword(s) according to the scheduling information decoded from the PDCCH. In other words, correctly decoding PDCCH is a prerequisite for properly decoding PDSCH.

In order to prevent the loss of transport blocks, LTE has adopted the Hybrid Automatic Repeat Request (HARQ) scheme. In the physical layer of Evolved UMTS Terrestrial Radio Access Network (E-UTRA), HARQ is implemented both in the UL and the DL. The acknowledgement message in E-UTRA is denoted as HARQ-ACK.

HARQ-ACK may be transmitted by the UE in response to certain PDSCH transmissions and includes one or several acknowledgements, either positive (ACK) or negative (NACK) in response to transport blocks transmitted in the DL. HARQ-ACK may be transmitted on one of the physical channels Physical Uplink Control Channel (PUCCH) or Physical Uplink Shared Channel (PUSCH).

But if the UE is not able to correctly decode the PDCCH, it cannot correctly decode PDSCH, and may even not know that it needs to send the HARQ feedback. This is called Discontinuous Transmission (DTX).

If the eNodeB (base station (BS)) detects ACK instead of DTX, a so called ACK false detection, the eNodeB will erroneously consider the corresponding DL transport block as correctly received. Since the transport block has not been correctly received by the UE, corresponding data will not be passed to the Medium Access Control (MAC) layer and from the MAC layer to the Radio Link Control (RLC) layer. Data will hence be missing in the RLC layer. This will cause ARQ retransmissions in the RLC layer which introduce delay and possibly large retransmissions which is very undesirable. Also, if a NACK is detected erroneously that in reality is DTX, the eNodeB will retransmit the packet in such a way that the UE will not be capable of decoding it.

As already indicated, a problem arises when the UE is not aware of the presence of the PDSCH assigned to it if it fails to decode the PDCCH successfully. In this case the UE will not generate ACK/NACK information. This situation has been well recognized and the UE response in such case is DTX, that is, neither an ACK nor a NACK signal is transmitted to the eNodeB.

Since the eNodeB has no prior knowledge of whether the UE has failed to detect the PDCCH, it expects or deems, that the symbols of the predetermined positions are ACK/NACK symbols and extracts them for the ACK/NACK decoder to decode. If the eNodeB disregards the possibility of DTX, either an ACK or NACK message will be returned by the ACK/NACK decoder to a higher layer upon the decoding of the extracted symbols, which are, in fact, conveying no information. In general, both ACK and NACK messages are equally likely to be returned.

The consequence of wrongly detecting a DTX as an ACK is more adverse to the system performance than wrongly detecting a DTX as a NACK.

Similarly, in 5G (or new radio (NR)) wireless communication systems, a message feedback scheme is also used for re-transmission control. ACK or NACK (AN) signals are used to indicate whether the signal is received successfully or not by the UE and whether the BS needs to retransmit the data. If the UE misses a DL control signal, the UE may encounter DTX in DL and the UE will not send any message back to the BS. However, the BS needs to detect one of three possible feedback states, i.e., ACK, NACK or DTX, for rearranging a next transmission to the UE.

FIG. 1 illustrates a method by which UL signals from the UE to the BS control transmission of payload control data and payload data on the DL from the BS to the UE. In the example of FIG. 1, it can be seen that, in response to a first "DL control for payload allocation #1" message from the BS to the UE, the UE, in this instance, responds with a UCI "NACK" message. The NACK message is received by the UCI receiver at the BS and, as a consequence, the BS is configured to retransmit to the UE the first "DL control for payload allocation #1" message and its associated first "DL payload data #1" message. In this example, the UE then returns a UCI "ACK" message to the UCI receiver in response to the retransmitted control signal message and, as a consequence, the BS is configured to then transmit to the UE the second "DL control for payload allocation #2" message and its associated second "DL payload data #2" message (not shown in FIG. 1). FIG. 1 therefore illustrates how data is retransmitted by the BS to the UE when the UE indicates that is has not successfully received a DL data control message.

In contrast, FIG. 2 illustrates what may happen when the UE misses a DL data control message. In this example, the UE has missed the first "DL control for payload allocation #1" message and consequently sends no ACK/NACK message back to the BS in response. This scenario represents a DTX state. The UCI receiver at the BS only receives noise but processes this as though it comprises an UL UCI signal with the result that, in this example, the UCI falsely detects or determines receipt of an ACK message from the UE and thus outputs a false ACK message. This causes the BS to commence a new control and payload data transmission in response to the false ACK message, e.g., "DL control for payload allocation #2", etc.

For 5G UCI, 3GPP Technical Specification 38.212 requires the support of two types of channel codes, namely polar code and small block code as illustrated respectively by FIGS. 3 and 4. Polar code relates to the situation where the number of payload bits is greater than 11. Small block code relates to the situation where the number of payload bits is equal to or less than 11.

As shown in FIG. 3, in a conventional polar code-based receiver, a cyclic redundancy check (CRC) may assist in detecting whether DTX occurs or not. The output from the polar code decoder comprises UCI bits but the CRC check function (module) enables the polar code-based receiver to distinguish between DTX on the one hand and UCI bits indicative of ACK or NACK on the other hand.

In FIG. 4 which shows a conventional small block code-based receiver where a CRC function is not available, incorrect detection of the ACK, NACK, or DTX signals leads to a waste of resources for retransmission and/or a loss of data packets. In the conventional small block code-based receiver where CRC is not available, ACK and NACK each issue with about 50% probability where the UE misses a DL control message and transmits nothing to the UE such that the BS receives only noise. In the small block code-based receiver, the output from the small block code decoder is assumed to be UCI bits leading to possible false ACK or false NACK outcomes. In other word, there is no means for distinguishing between DTX on the one hand and UCI bits indicative of ACK or NACK on the other hand.

In the conventional small block code-based UCI receiver of FIG. 4, the resource element (RE) demapper output will be treated by an equalizer module to generate an equalized signal. The equalized signal will then be treated by a demodulation module to generate a demodulated soft bit sequence (SEQ). The demodulated soft bit SEQ will be handled by a descrambling module to create a descrambled soft bit SEQ. The descrambled soft bit SEQ will then be handled by a rate de-matching module to create a de-matched soft bit SEQ. The de-matched soft bit SEQ will be decoded through a decoder for small block code module to generate UCI bits (ACK/NACK). The soft bits comprise real signal values which differ from hard bits which are resolved to binary values.

As already explained with respect to FIGS. 1 and 2, if a UE loses a DL control signal, the UE will not send UCI ACK/NACK feedback, i.e., a DTX state will occur. The BS treats DTX as an unsuccessful DL transmission. Re-transmission is required if and when DTX occurs. But if the DTX is falsely detected as ACK, re-transmission will not be performed. More especially, DTX may occur only partially, i.e., only part of the UCI payload bits may be missing. Compared with full DTX where all UCI bits are missing, partial DTX is much more difficult to detect. From a perspective of the small block code-based UCI receiver, a partial DTX codeword still belongs to the set of valid codewords. In view of the fact that the small block code-based UCI receiver has no CRC check to assist with full or partial DTX detection, there is a need to be able to effectively detect partial DTX, i.e., there is a need to effectively distinguish a partial DTX signal from a non-DTX signal.

CN105491591 discloses a UCI receiver device which is configured to divide the descrambled sequence into N blocks each containing 32 soft bits. It then compares the signs of soft bits in a first block with all other N−1 blocks. It computes the number of same sign pairs as a, and the number of different sign pairs as b. It compares the ratio a/b with a predetermined DTX threshold value Th. If ah is less than or equal to Th then a DTX state is determined to have occurred, but, if a/b is greater than Th, then no DTX state is determined to have occurred. The DTX decision is a hard decision based on the signs of the soft bits. The decision is sensitive to the noise or UL channel impairment. If the number of non-DTX blocks of the N blocks is much higher than the number of DTX blocks, then the ratio a/b can still be high meaning that it is hard to determine if a DTX state has occurred using this metric. It is therefore difficult to detect DTX if only some RBs in any of the N blocks suffer DTX. Furthermore, different DTX scenarios between RBs within a 32-bit block are not considered.

CN104168095 discloses a UCI receiver device which is configured to decode the descrambled sequence to obtain a received UCI b. It then obtains a canonical sequence by selecting a sub-sequence with 32 soft bits from the descrambled sequence. It decodes the canonical sequence to obtain a canonical UCI r. It then compares the received UCI with the canonical UCI r to determine if a DTX state has occurred. This is a highly complex solution which requires a high signal to noise ratio (SNR) to decode UCI. It is difficult to select a suitable canonical sequence. It does not make use of an adjustable threshold.

Among other things, what is therefore desired is a method for distinguishing a partial DTX signal from a non-DTX signal.

OBJECTS OF THE INVENTION

An object of the invention is to mitigate or obviate to some degree one or more problems associated with known methods of determining or detecting DTX on a UL at a UCI receiver in a wireless communication network.

The above object is met by the combination of features of the main claims; the sub-claims disclose further advantageous embodiments of the invention.

Another object of the invention is to provide a method of distinguishing a partial DTX signal from a non-DTX signal on a UL at a UCI receiver in a wireless communication network.

Another object of the invention is to provide a method of distinguishing a partial DTX signal from a non-DTX signal on a UL at a UCI receiver in a wireless communication network using bits reconstruction.

Another object of the invention is to provide an improved UCI receiver.

A further object of the invention is to provide an improved small block code-based UCI receiver.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method to determine DTX when PUCCH carries the UCI feedback from a UE to a BS. Particularly, it is a method to effectively distinguish a partial DTX signal from a non-DTX signal on the UL to the UCI receiver.

More generally, the invention provides a method and a device for detecting a DTX state at a UCI receiver in a wireless communication system The method comprises receiving a linear block encoded signal on an uplink at said UCI receiver and processing the received signal after resource element (RE) demapping to generate a soft bit sequence $\vec{s}$. The method includes selecting a plurality of bits in said generated soft bit sequence $\vec{s}$ as comparison bits and comparing said selected comparison bits to corresponding bits in a reconstructed soft bit sequence $\vec{r}$. The reconstructed soft bit sequence $\vec{r}$ is generated from a plurality of bits selected as reconstruction bits in said generated soft bit sequence $\vec{s}$. A comparison or correlation metric is determined from the comparison bits and the corresponding bits in the reconstructed soft bit sequence $\vec{r}$ and a determination made of the occurrence of a DTX state by evaluating the determined comparison or correlation metric.

In a first main aspect, the invention provides a method of detecting a DTX state at a UCI receiver, the method comprising: receiving a linear block encoded signal on an uplink (UL) at said UCI receiver; processing the received linear block encoded signal after resource element (RE) demapping to generate a soft bit sequence $\vec{s}$; selecting a plurality of bits in said generated soft bit sequence $\vec{s}$ as comparison bits; comparing said selected comparison bits to corresponding bits in a reconstructed soft bit sequence $\vec{r}$, where said reconstructed soft bit sequence $\vec{r}$ is generated from a plurality of bits selected as reconstruction bits in said generated soft bit sequence $\vec{s}$; determining a comparison or correlation metric between said selected comparison bits of the generated soft bit sequence $\vec{s}$ and the corresponding bits in the reconstructed soft bit sequence $\vec{r}$; and determining if a DTX state has occurred by evaluating the determined comparison or correlation metric.

In a second main aspect, the invention provides a method of processing a linear block encoded signal at a UCI receiver, the method comprising: receiving the linear block encoded signal on an uplink (UL) at said UCI receiver; processing the received linear block encoded signal after resource element (RE) demapping to generate a soft bit sequence; selecting a plurality of bits in said generated soft bit sequence as verification bits; comparing said selected verification bits of the generated soft bit sequence to corresponding bits in a reconstructed soft bit sequence, where said reconstructed soft bit sequence is generated from a plurality of bits selected as reconstruction bits in said generated soft bit sequence; determining from the comparison of said selected verification bits of the generated soft bit sequence with the corresponding bits in the reconstructed soft bit sequence whether or not to compare the selected reconstruction bits of said generated soft bit sequence with corresponding bits in the reconstructed soft bit sequence.

In a third main aspect, the invention provides a UCI receiver in a wireless communication system, the UCI receiver comprising: a memory storing machine-readable instructions; and a processor for executing the machine-readable instructions such that, when the processor executes the machine-readable instructions, it configures the UCI receiver to implement the method of the first main aspect of the invention and/or the second main aspect of the invention.

In a fourth main aspect, the invention provides a non-transitory computer-readable medium storing machine-readable instructions, wherein, when the machine-readable instructions are executed by a processor of a UCI receiver in a wireless communication system, they configure the processor to implement the method of the first main aspect of the invention and/or the second main aspect of the invention.

The summary of the invention does not necessarily disclose all the features essential for defining the invention; the invention may reside in a sub-combination of the disclosed features.

The forgoing has outlined broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which:

FIG. 19 shows an example of the encoding matrix M;

FIG. 20 shows an example of the reconstruction matrix R;

DESCRIPTION OF PREFERRED EMBODIMENTS

Figure 1:
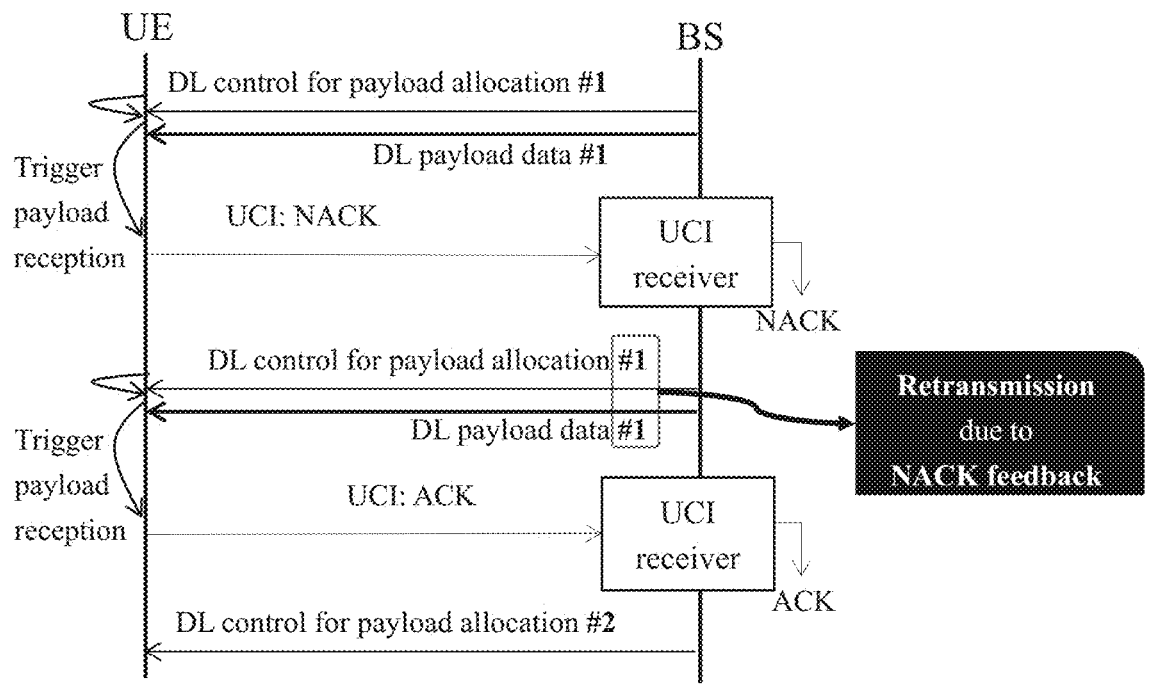
FIG. 1 is a signal diagram illustrating message exchanges between a BS and a UE for retransmission of control data and payload data.
Figure 2:
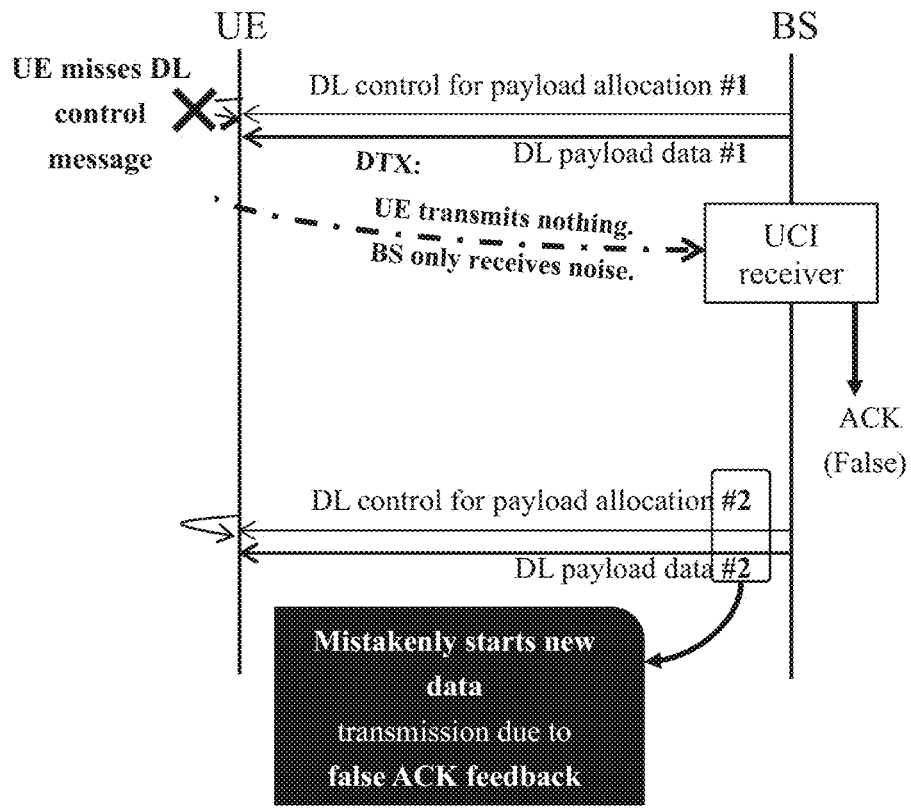
FIG. 2 is a signal diagram illustrating errant transmission of control data and payload data from a BS to a UE when a UCI receiver at the BS determines a false ACK message.
Figure 3:
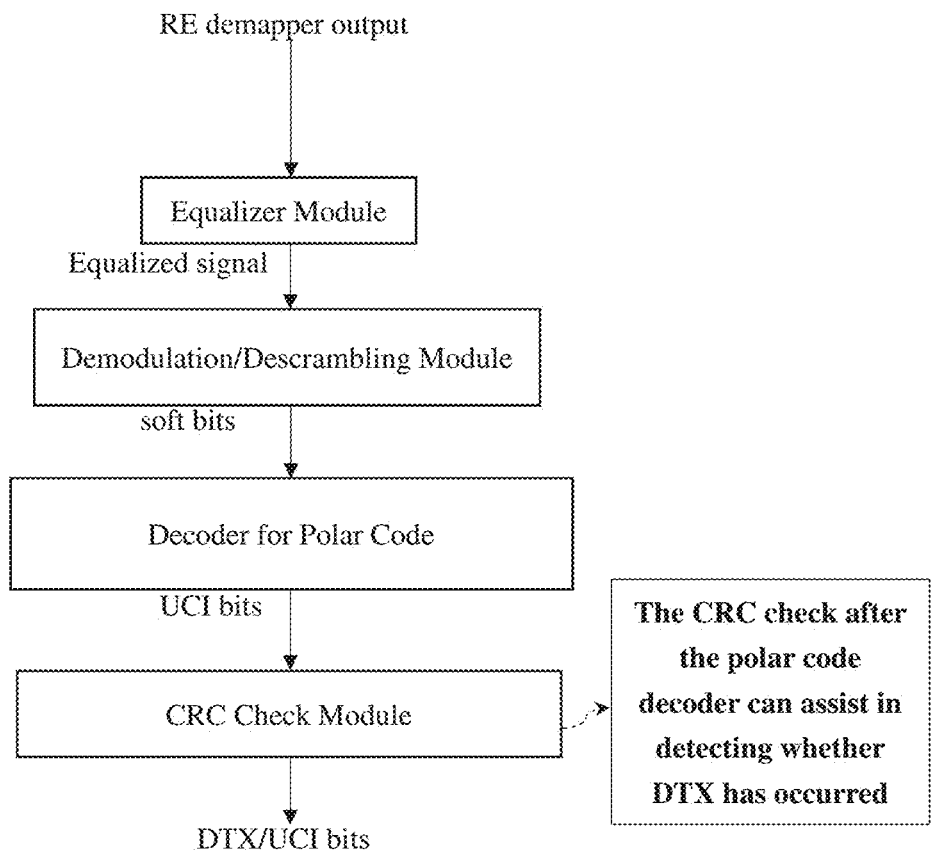
FIG. 3 is a block schematic diagram of a conventional polar code-based receiver for a 5G communications system.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided using dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 5:
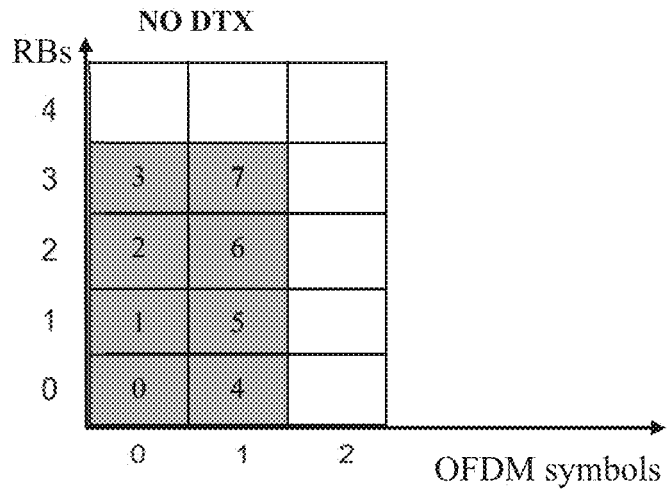
FIG. 5 illustrates an RE map for PUCCH Format 2 where no DTX state has occurred.

FIG. 5 illustrates a RE map for PUCCH Format 2 for a linear block encoded signal received at a small block code-based UCI receiver of a BS where no DTX state has occurred. In this case, all RBs or PUCCH units are successfully received, each of which comprises 16 bits for a total of 128 bits transmitted.

Figure 4:
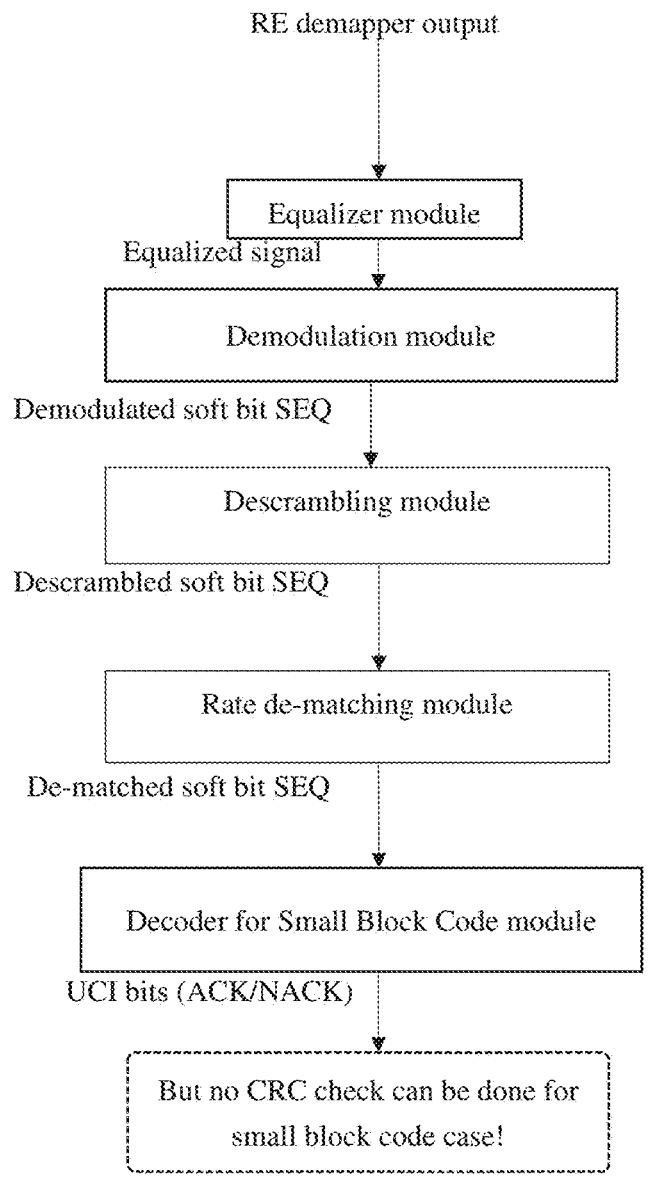
FIG. 4 is a block schematic diagram of a conventional small block code-based receiver for a 5G communications system.
Figure 6:
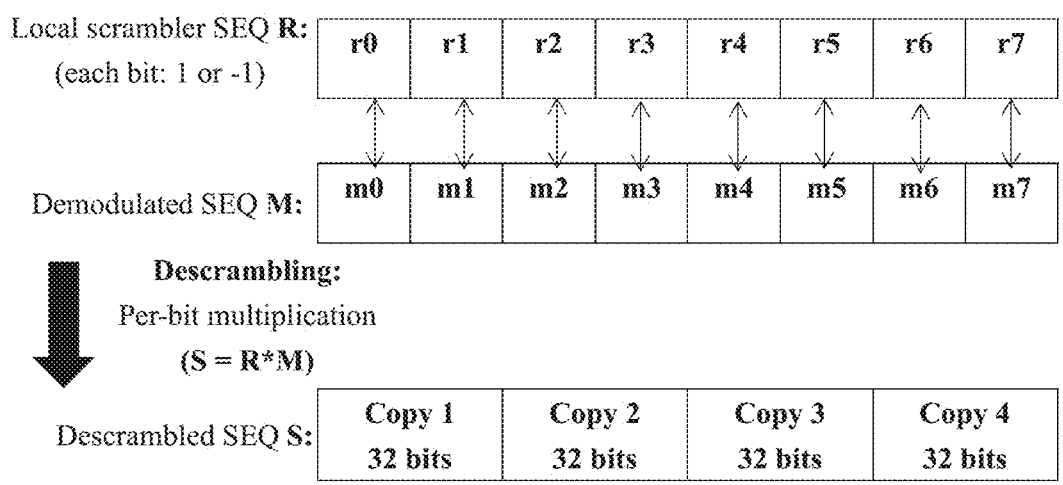
FIG. 6 illustrates the descrambling procedure for the RE map of FIG. 5 where no DTX state has occurred.

FIG. 6 illustrates the descrambling procedure for the RE map of FIG. 5 in which the local scrambled SEQ R comprising eight 16-bit blocks of r0 to r7 of hard bits having the binary values "1" or "−1" are demodulated in the demodulation module (FIG. 4) to provide a demodulated SEQ M comprising eight 16-bit blocks of soft bits m0 to m7. In this example, all the r0 to r7 blocks of SEQ R are aligned with their respective blocks m0 to m7 of SEQ M which enables the descrambling module (FIG. 4) to descramble the demodulated SEQ M to provide a descrambled SEQ S (where S=R*M) comprising four valid 32 soft bit copies of the received linear block encoded signal.

Figure 7:
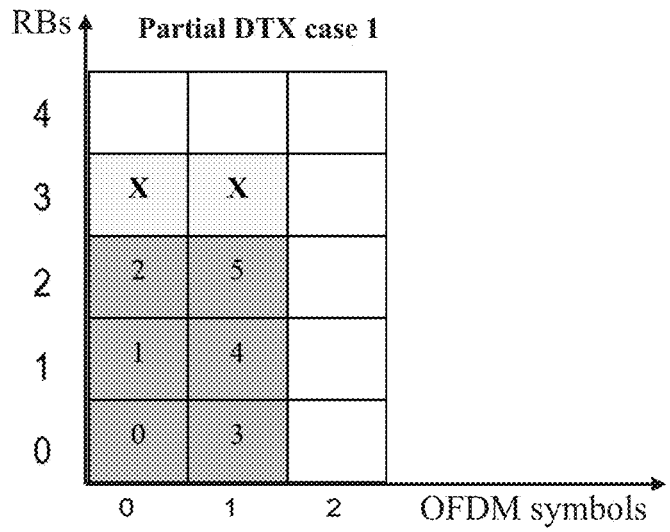
FIG. 7 illustrates an RE map for PUCCH Format 2 where a first partial DTX state has occurred.

FIG. 7 illustrates the RE map for PUCCH Format 2 for the linear block encoded signal received at the small block code-based UCI receiver of the BS where a first partial DTX state has occurred. In this instance, the last RB for each symbol is not successfully transmitted and noise denoted in FIG. 7 as "X" is received in each missing RB's place. However, the UCI receiver will assume that the received noise comprises a valid part of the received linear block encoded signal and will process it as such which may lead to a false ACK or NACK state. A partial DTX represents an unsuccessful DL transmission and needs to be treated as a DTX state. For a small block code-based UCI receiver, DTX is difficult to determine or detect, but partial DTX is especially difficult to detect or determine compared to a full DTX state where all the RBs for the symbols are not successfully transmitted and only noise is received at the UCI receiver.

Figure 8:
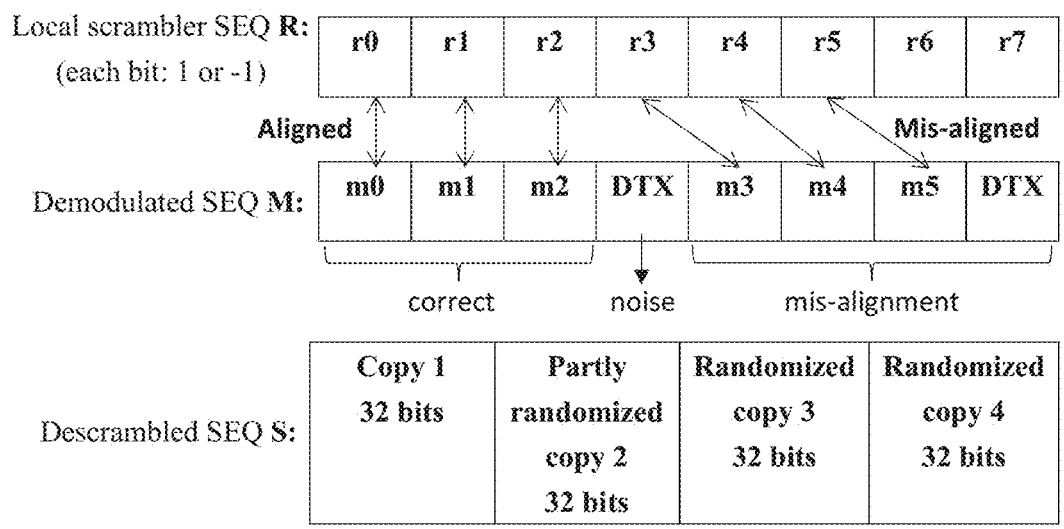
FIG. 8 illustrates the descrambling procedure for the RE map of FIG. 7 where a first partial DTX state has occurred.

FIG. 8 shows the descrambling procedure for the RE map of FIG. 7 where the first partial DTX state has occurred. Due to the partial DTX state, some copies of the received linear block encoded signal will be partially or fully randomized. In this case, only the blocks m0 to m2 of SEQ M are aligned with blocks r0 to r2 of SEQ R whereas blocks m3 to m5 of SEQ M are aligned with blocks r4 to r6 of SEQ R and thus mis-aligned with blocks r3 to r5 of SEQ R. SEQ M therefore comprises some correctly aligned blocks, some noise blocks and some mis-aligned blocks with the result that the descrambled SEQ S comprises one valid 32 bit copy of the received linear block encoded signal, a partially randomized copy and two fully randomized copies as shown in FIG. 8.

Figure 9:
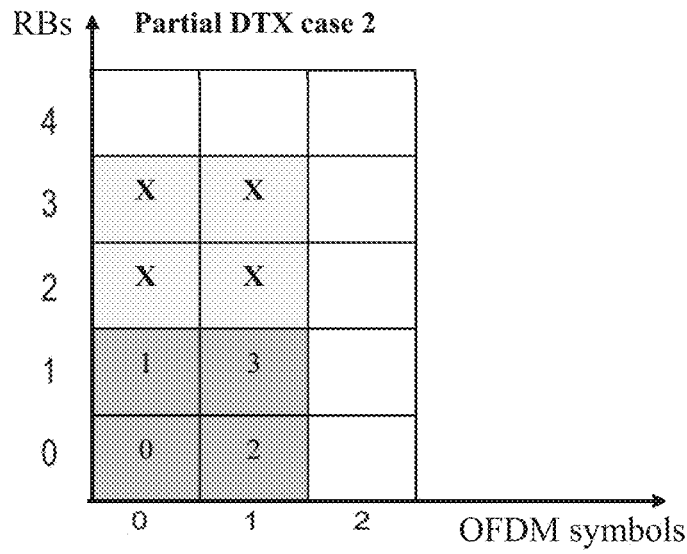
FIG. 9 illustrates an RE map for PUCCH Format 2 where a second partial DTX state has occurred.

FIG. 9 illustrates the RE map for PUCCH Format 2 for the linear block encoded signal received at the small block code-based UCI receiver of the BS where a second partial DTX state has occurred. In this instance, the last 2 RBs or PUCCH units for each symbol are not successfully transmitted and noise is received in each missing RB's place.

Figure 10:
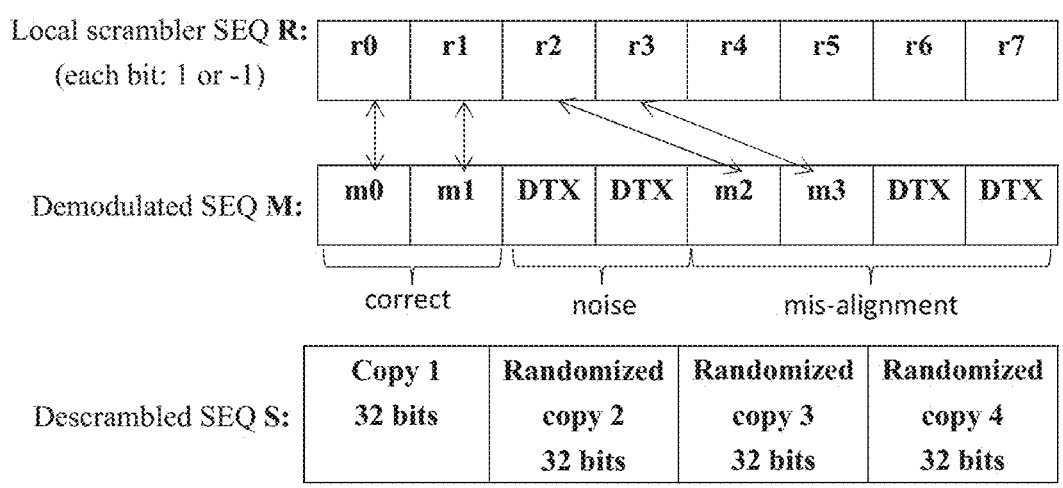
FIG. 10 illustrates the descrambling procedure for the RE map of FIG. 9 where a second partial DTX state has occurred.

FIG. 10 shows the descrambling procedure for the RE map of FIG. 9 where the second partial DTX state has occurred. In this case, only the blocks m0 to m1 of SEQ M are aligned with blocks r0 to r1 of SEQ R whereas blocks m2 to m3 of SEQ M are aligned with blocks r4 to r5 of SEQ R and thus mis-aligned with blocks r2 to r3 of SEQ R. SEQ M therefore comprises some correctly aligned blocks, some noise blocks and some mis-aligned blocks with the result that the descrambled SEQ S comprises one valid 32-bit copy of the received linear block encoded signal and three fully randomized copies.

Figure 11:
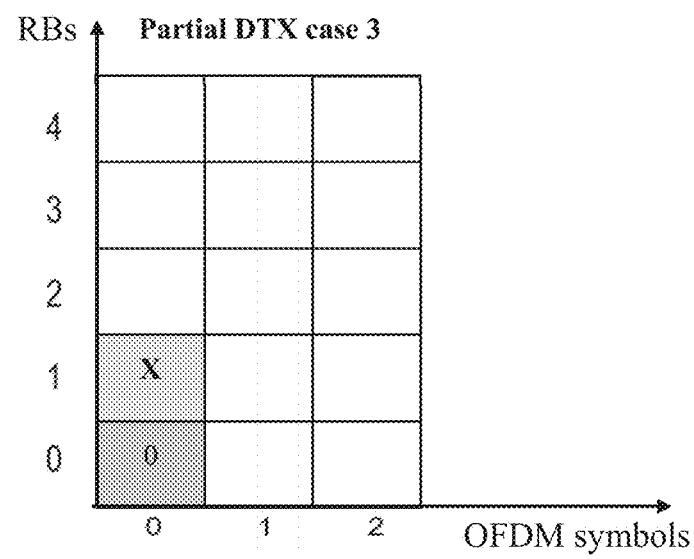
FIG. 11 illustrates an RE map for PUCCH Format 2 where a third partial DTX state has occurred.

FIG. 11 illustrates the RE map for PUCCH Format 2 for the linear block encoded signal received at the small block code-based UCI receiver of the BS where a third partial DTX state has occurred. In this instance, only one OFDM symbol and 2 RBs are successfully transmitted, and noise is received in each missing RB's place. In this case, correlation between multiple sub-sequences is not possible because, if no DTX state has occurred, only one copy of the received linear block encoded signal can be obtained and, if a DTX state has occurred, only one half-copy of the received linear block encoded signal can be obtained.

The invention is therefore directed to solving at least the aforementioned technical problem by providing a method and a device in the form of a UCI receiver to detect a partial DTX state by distinguishing a partial DTX signal from a non-DTX signal preferably using bits reconstruction as hereinafter described, although the method of distinguishing a partial DTX signal from a non-DTX signal using bits reconstruction can be used in combination with other methods of distinguishing a partial DTX signal from a non-DTX signal.

Figure 12:
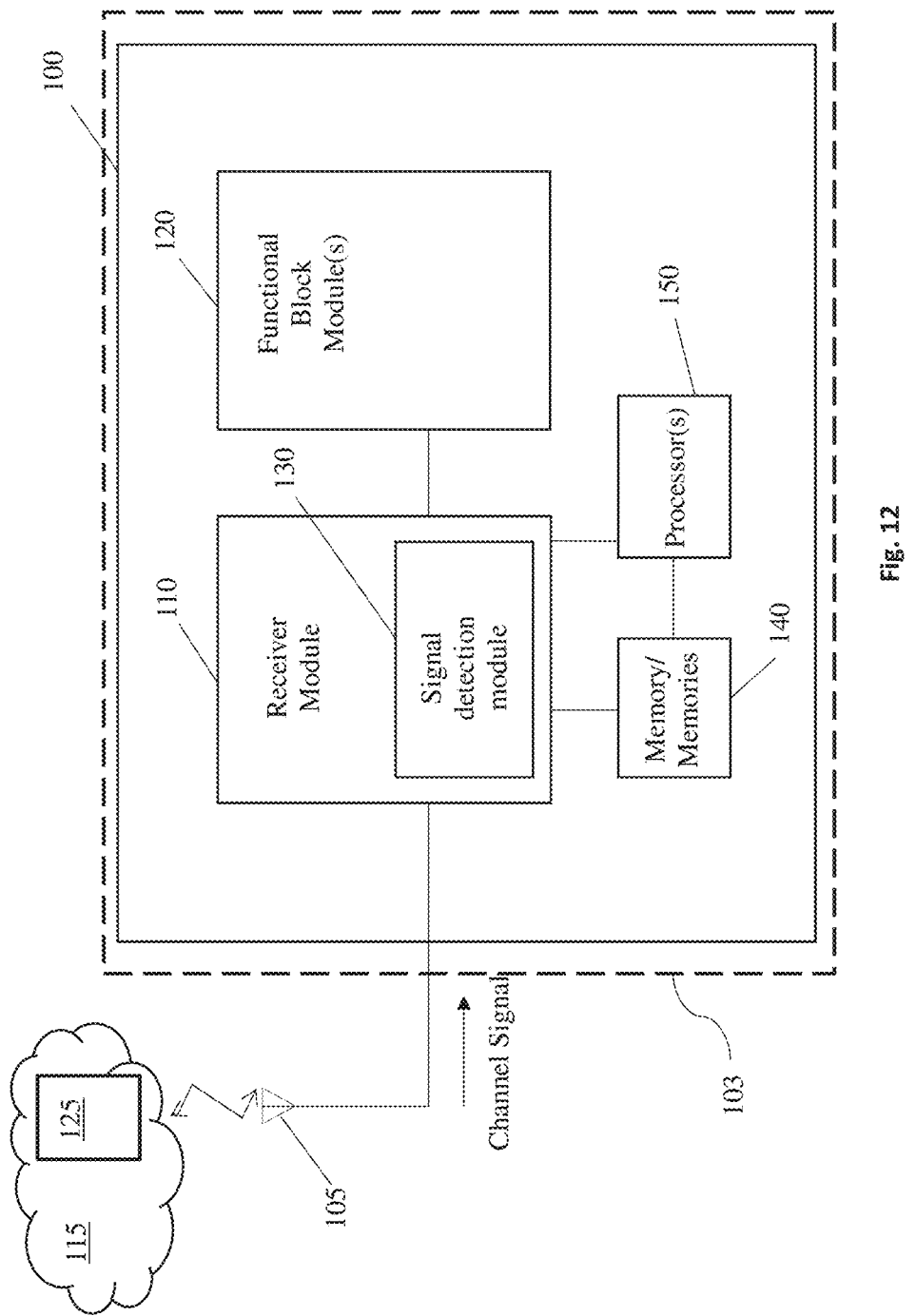
FIG. 12 is a block schematic diagram of an improved UCI receiver in accordance with the invention.

FIG. 12 shows an exemplary embodiment of an improved UCI receiver 100 in accordance with concepts of the present invention. In the illustrated embodiment, the UCI receiver 100 may comprise communication equipment such as a network node, a network card, or a network circuit communicatively connected to or forming part of a BS 103 (denoted by dashed line in FIG. 12), etc. operating in a 5G communications system environment 115, although the improved UCI receiver 100 of the invention is not limited to operating in a 5G communications system but could comprise a UCI receiver for a 4G cellular network or any cellular network. The BS 103 communicates with one or more UEs 125.

The UCI receiver 100 may comprise a plurality of functional blocks for performing various functions thereof. For example, the UCI receiver 100 includes receiver module 110 providing received signal processing and configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing. Irrespective of the particular configuration of receiver 110, embodiments include signal detection module 130 disposed in association with the receiver module 110 for facilitating accurate processing and/or decoding of a received channel signal in accordance with the invention. Channel signals may be received via an antenna module 105.

Although the signal detection module 130 is shown as being deployed as part of the receiver module 110 (e.g., comprising a portion of the receiver module control and logic circuits), there is no limitation to such a deployment configuration according to the concepts of the invention. For example, the signal detection module 130 may be deployed as a functional block of UCI receiver 100 that is distinct from, but connected to, receiver module 110. The signal detection module 130 may, for example, be implemented using logic circuits and/or executable code/machine readable instructions stored in a memory 140 of the UCI receiver 100 for execution by a processor 150 to thereby perform functions as described herein. For example, the executable code/machine readable instructions may be stored in one or more memories 140 (e.g., random access memory (RAM), read only memory (ROM), flash memory, magnetic memory, optical memory or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g., application specific integrated circuit (ASIC), field programmable gate array (FPGA), graphics processing unit (GPU), and/or the like) configured to perform functions of the signal detection module 130 as described herein.

Figure 13:
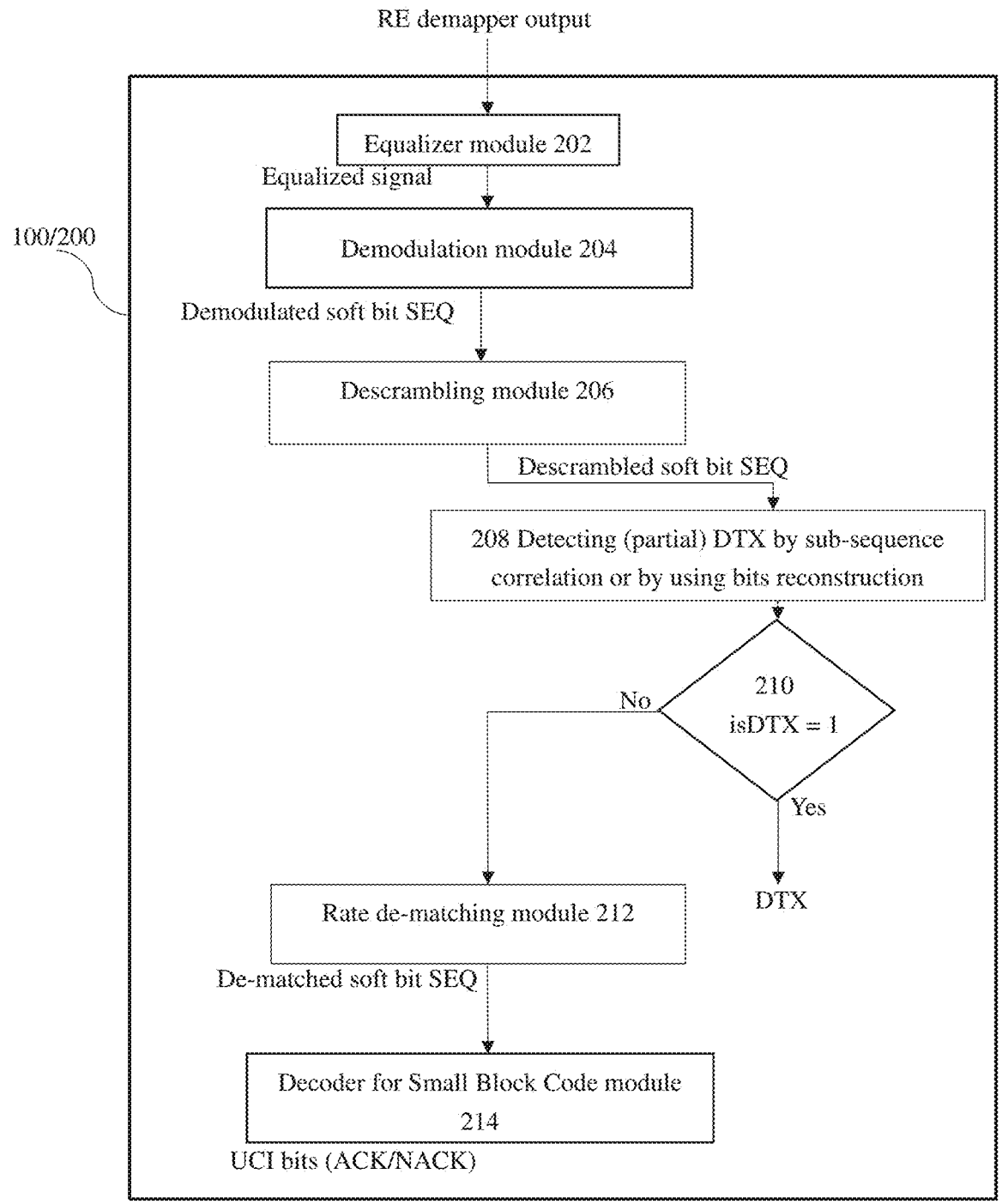
FIG. 13 is a schematic block diagram of the improved UCI receiver device in accordance with the invention illustrating in principle a method in accordance with the invention performed by said UCI receiver.

FIG. 13 a schematic block diagram of the improved UCI receiver device in accordance with the invention illustrating in principle a method in accordance with the invention by the signal detection module 130 (FIG. 12) for the improved linear block code-based UCI receiver 100/200. In one embodiment, the UCI receiver 100/200 is configured to receive a UL UCI signal as a demapper output signal. The demapper output signal is firstly equalized in a known manner in an equalizer module 202 to provide an equalized signal. The equalized signal is then demodulated, again in a known manner, by a demodulation module 204 which outputs soft bits comprising a demodulated soft bit SEQ to a descrambling module 206. The method of the invention comprises taking the descrambled soft bit SEQ s outputted by the descrambling module 206 and processing said descrambled soft bit SEQ S, in step 208, to distinguish whether a received linear block code signal is a partial DTX signal or a non-DTX signal. As will be described hereinafter, a preferred method of detecting a DTX state is based on bits reconstruction. This method is preferred when only one copy or less of the received linear block encoded signal is obtained. Then, in decision box 210, a determination is made on whether a DTX state is determined to have occurred or not. If the determination is in the affirmative, then processing of the received linear block code signal may be terminated. If the determination is negative, then the descrambled soft bit SEQ s of the received linear block code signal is inputted to a rate de-matching module 212 which processes the descrambled soft bit SEQ in a known manner to output a de-matched soft bit SEQ to a decoder module 214 which, also in a known manner, generates UCI ACK/NACK bits.

It will be appreciated therefore that the method of the invention can be implemented in a conventional UCI receiver through any of software, firmware and/or hardware changes to the conventional UCI receiver and is preferably implemented only by way of software changes.

A correlation method not using bits reconstruction is described with reference to FIGS. 14 to 18. This method can be employed in combination with the reconstruction bits method hereinafter described.

Figure 14:
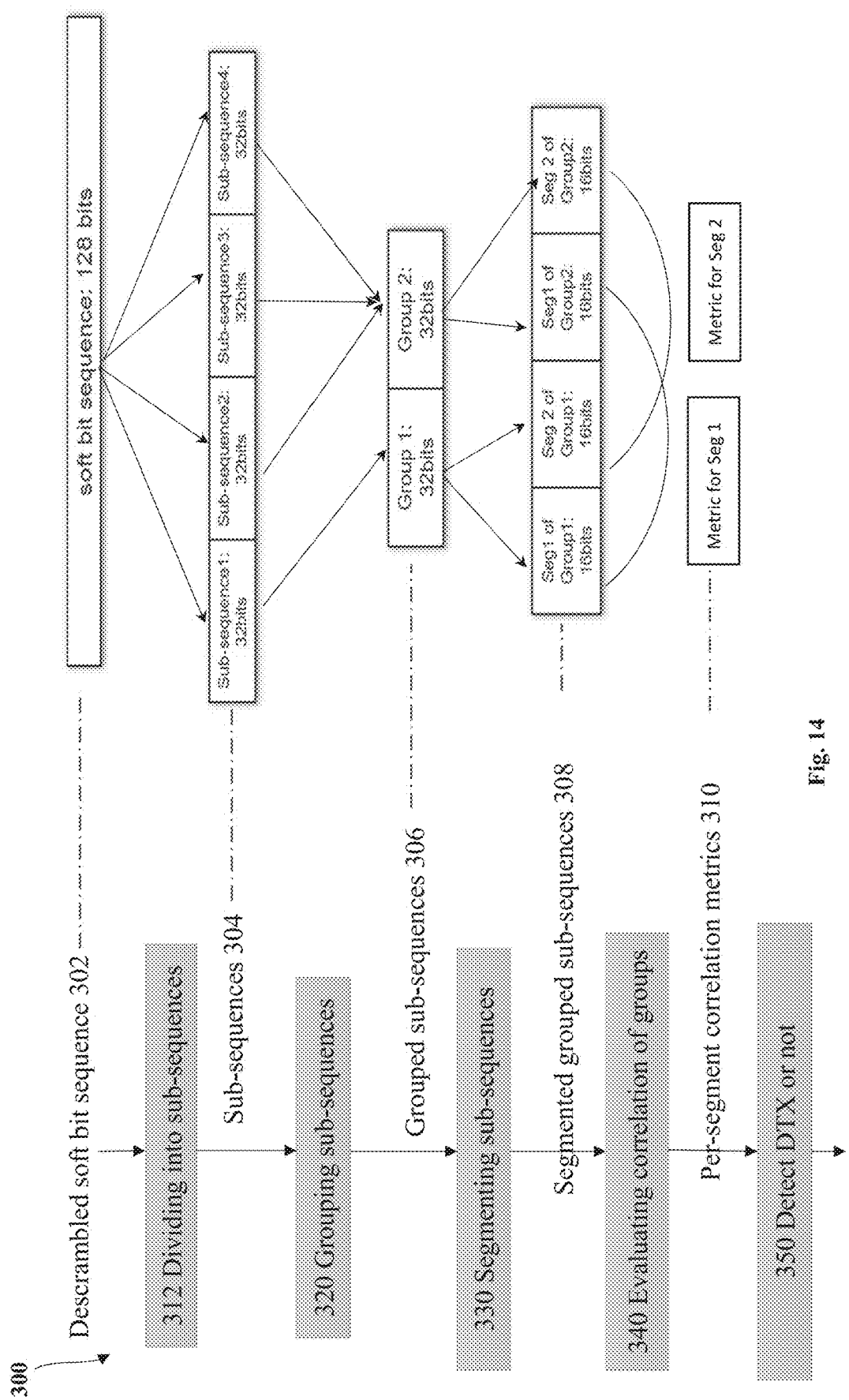
FIG. 14 diagrammatically illustrates the main steps of the method of FIG. 13.
Figure 15:
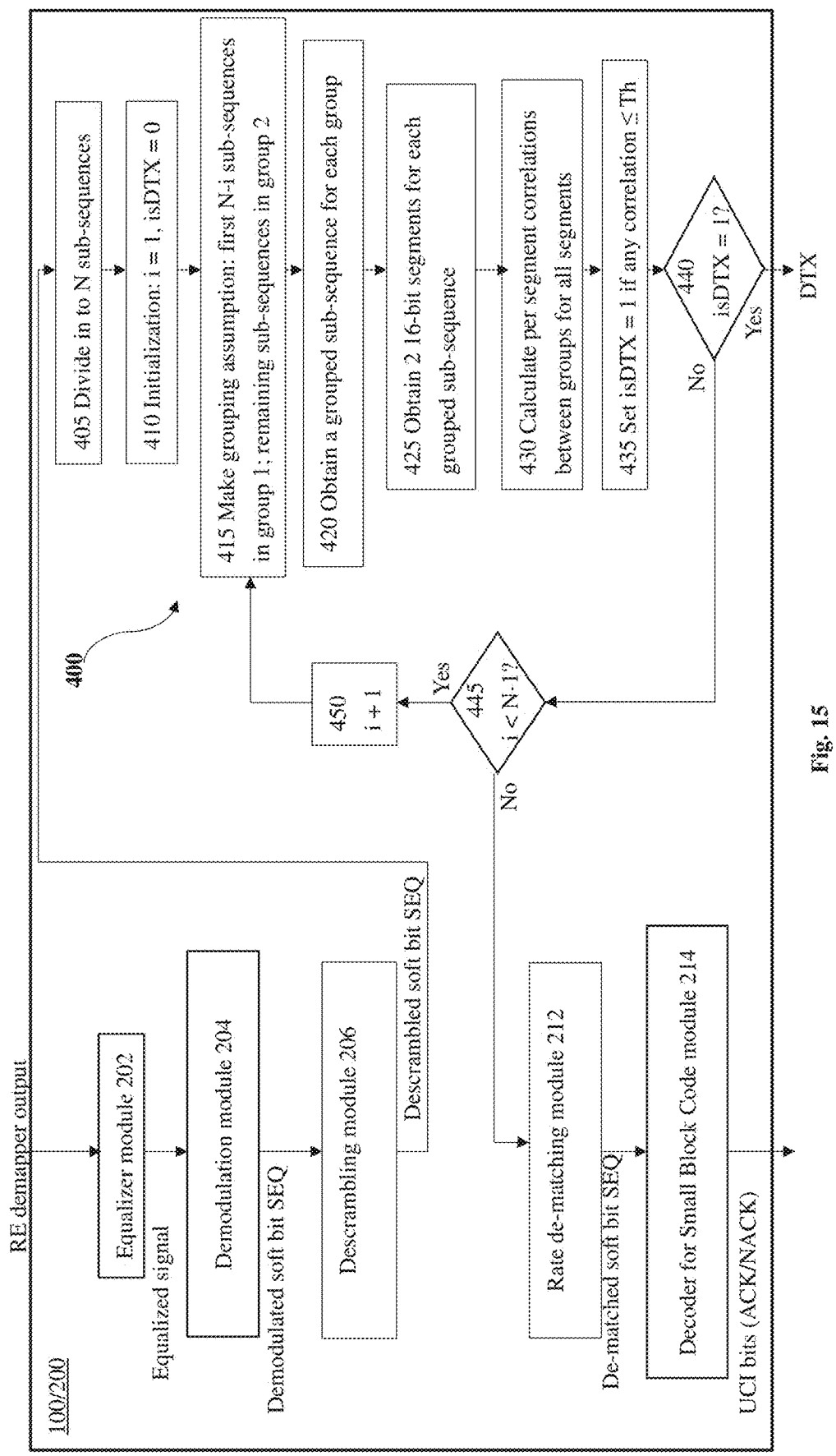
FIG. 15 is a schematic block diagram of the improved UCI receiver device in accordance with the invention showing the detailed steps of the method in accordance with the invention.

In FIGS. 14 and 15, the signal detection module 130 of the UCI receiver 100/200 is configured to implement the steps of the correlation method not using bits reconstruction to distinguish whether a received linear block code signal is a partial DTX signal or a non-DTX signal. From this, it can be determined if a (partial) DTX state has occurred.

Referring to FIG. 14, shown are the main steps of such method 300. The descrambled soft bit sequence 302 comprising 128 soft bits is transformed, in a first step 312, into multiple sub-sequences 304. Preferably, the descrambled soft bit sequence 302 is transformed or divided into four sub-sequences 304 of a predefined length, i.e., each sub-sequence 304 having a length of 32 soft bits. Preferably, each 32-bit sub-sequence 304 comprises one copy of the descrambled linear block encoded signal. In the event that a length of a last one of the multiple sub-sequences 304 is less than the predefined length then the method may include either of padding said last one of the multiple sub-sequences 304 with zeros or omitting said last one of the multiple sub-sequences 304 from the further method steps. Preferably also, the predefined length comprises a linear block encoded signal encoded codeword length.

Whilst the preference in the method 300 is to perform grouping and segmenting steps before evaluating correlation metrics as will be described below, in one arrangement of the method 300, correlation metrics may be determined for two or more of the multiple sub-sequences 304 and, based on an evaluation of the determined correlation metrics, a determination is then made of whether or not a (partial) DTX state has occurred, i.e. a determination is made as to whether or not a received linear block encoded signal exhibits partial DTX.

Partial DTX causes randomness between the multiple sub-sequences 304 which leads to low correlation between said multiple sub-sequences 304. In this arrangement of the method 300, the method takes advantage of the low correlation between said multiple sub-sequences 304 to determine whether a received linear block encoded signal exhibits partial DTX or not. This may be achieved by comparing said correlation metrics to each other or by comparing said correlation metrics to one or more selected, calculated or predetermined thresholds Th.

Preferably, however, the method 300 includes a step 320 of grouping the multiple sub-sequences 304 into sub-sequence groups 306, also referred to as grouped sub-sequences 306. In this example, the grouping step 320 groups a first of the sub-sequences 304 into a first sub-sequence group "Group 1" having a length of 32 soft bits and the three remaining sub-sequences 304 into a second sub-sequence group "Group 2" also having a length of 32 soft bits. Group 2 may be derived by combining corresponding entries or bits with the same index from the three remaining sub-sequences 304. This may be achieved by summation of the values of the corresponding soft bits, calculating the average mean values of the corresponding soft bits, calculating the normal values of the corresponding soft bits, or other statistical combination methods. It will be understood that the Group 1 and Group 2 sub-sequence groups may comprise different derivations or combinations of the sub-sequences 304. It is preferred that the four sub-sequences 304 are grouped into only two sub-sequence groups 306. In one arrangement of the method 300, the correlation metrics 310 may be determined for two or more of the sub-sequence groups 306, and, based on an evaluation of the determined correlation metrics, a determination is then made of whether a (partial) DTX state has occurred or not.

The benefit of the grouping step 320 is that randomness in channel noise also causes low correlation. The grouping step 320 therefore can average out such randomness and thereby make the randomness caused by (partial) DTX more evident, i.e., less difficult to detect a partial DTX signal.

Preferably further, however, the method 300 includes a step 330 of segmenting each sub-sequence group 306 into sequence segments 308, also referred to as segmented grouped sub-sequences 308. Preferably, each of the Group 1 and Group 2 sub-sequence groups 306 is segmented into 16-bit sequence segments as shown in FIG. 14. The segmenting step 330 may include segmenting each sub-sequence group 306 into a predefined number of sequence segments 308. The predefined number of sequence segments is preferably 2. The segmenting step 330 may comprise forming a first half of a sub-sequence group 306 into a first sequence segment 308 and a second half of the sub-sequence group 306 into a second sequence segment 308 for that sub-sequence group 306. In some instances, a whole sub-sequence group 306 can be treated as comprising a sequence segment 308. Segmenting each sub-sequence group 306 into a predefined number of sequence segments 308 may comprise treating each part of a sub-sequence group 306 that corresponds to an RB as one sequence segment 308.

Then, in step 340, determining and evaluating correlation metrics 310 for the sequence segments 308 of two or more of the sub-sequence groups 306 and, in step 350, detecting if a (partial) DTX state has occurred from the evaluation of the determined correlation metrics 310.

The correlation metric ρ is derived from the cosine similarity:

$$\rho_{xy} = \frac{x \cdot y}{\|x\|\|y\|}$$

where x and y are two vectors;
x·y comprises the dot product of x and y;
$\|x\|$ is the magnitude of x; and
$\|y\|$ is the magnitude of y.

Preferably, correlation metrics 310 are calculated for each sequence segment 308 of the two sequence groups 306, Group 1 and Group 2. A per segment correlation metric for segment 1 of Group 1 and segment 1 of Group 2 may comprise a product of the correlation metrics 310 for said two segments where said resultant segment 1 correlation metric is compared to a selected, calculated or predetermined threshold Th to determine if a partial DTX state has occurred. In a similar manner, a per segment correlation metric for segment 2 of Group 1 and segment 2 of Group 2 may comprise a product of the correlation metrics 310 for said two segments and the resultant segment 2 correlation metric then compared to a same threshold Th or to a different respective threshold Th. Alternatively, each of the correlation metrics 310 for segment 1 of Group 1 and segment 1 of Group 2 may be separately compared to a same threshold Th or to respective different thresholds Th where, if either of the comparisons suggest a (partial) DTX state has occurred, then such a state is determined as having occurred. Processing of the received linear block encoded signal may be terminated once it is determined that a (partial) DTX state has occurred.

In one embodiment, the correlation metrics 310 may be calculated for pairs of sequence segments 308. Calculating the per-sequence segment correlation metric(s) 310 for the sub-sequence(s) 304 in the sub-sequence groups 306 may comprise identifying two sub-sequence groups 306 from all sub-sequence groups 306 as a group pair and calculating the per-segment correlation metric(s) 310 for the selected group pair. Identifying two sub-sequence groups 306 from all sub-sequence groups 306 as a group pair may comprise arbitrarily selecting any two sub-sequence groups 306 or selecting one sub-sequence group 306 and identifying it as a first sub-sequence group 306 and then selecting another sub-sequence group 306 from remaining sub-sequence groups 306 as a second sub-sequence group 306. This may also include selecting a sub-sequence group 306 with a lowest expected probability of DTX, selecting a sub-sequence group 306 corresponding to a first RB, or selecting a first occurring sub-sequence group 306.

The method may include obtaining the correlation metrics 310 for a group pair based on the correlation metrics for all or some of the sequence segments 308 comprising said group pair. This may comprise calculating combinations of the correlation metrics for all or some of the sequence segments 308 comprising said group pair for combined sequence segments 308. The combinations of the correlation metrics may be calculated based on any of the summed values of the combined correlation metrics, the average of the values of the combined correlation metrics, the normal values of the combined correlation metrics, the product of the combined correlation metrics or by other suitable statistical combination methods.

The segmenting step 330 takes advantage of the fact that some copies of the descrambled signal as shown in FIG. 8 are only partially randomized on a granularity level of 1 RB. Segmenting a copy of the descrambled signal into single RB-segments can capture this characteristic and make (partial) DTX less difficult to detect.

In the foregoing, the correlation metric may comprise any one or any combination of: a cosine similarity; a correlation coefficient, optionally the Pearson correlation coefficient; and a distance characteristic or value, optionally a Euclidean Distance.

Soft bits preserve characteristics of the linear block encoded signal that are not preserved by hard bits so there are unexpected advantages to evaluating correlation metrics based on soft bits rather than hard bits. Furthermore, soft bits are less sensitive to SNR.

The method 300 therefore includes comparing the determined correlation metrics 310 to at least one selected, calculated or predetermined threshold Th such that if any, some or all of said determined correlation metrics 310 is less than or equal to said at least one threshold Th then a DTX state is determined to have occurred.

The at least one threshold Th may comprise any of: a single threshold for all sub-sequence groups 306; different thresholds for different sub-sequence groups 306; multiple thresholds for one or more of the sub-sequence groups 306. The multiple thresholds Th for one of said sub-sequence groups 306 may comprise a respective threshold Th for each sequence segment 308 of said sub-sequence group 306.

FIG. 15 is a schematic block diagram of the improved UCI receiver device 100/200 showing the detailed steps of the correlation method not using bits reconstruction.

The method 400 comprises a first step 405 of dividing the 128-bit descrambled soft bit SEQ 302 into N sub-sequences 304 where N is a number of the multiple sub-sequences 304 comprising the soft bit sequence 302. N is preferably 4. In an initialization step 410, an iterative value i is set to a value of "1" and DTX is assumed to have a value of "0" meaning that it is assumed that no DTX state has occurred or has been detected or determined.

Figure 16:
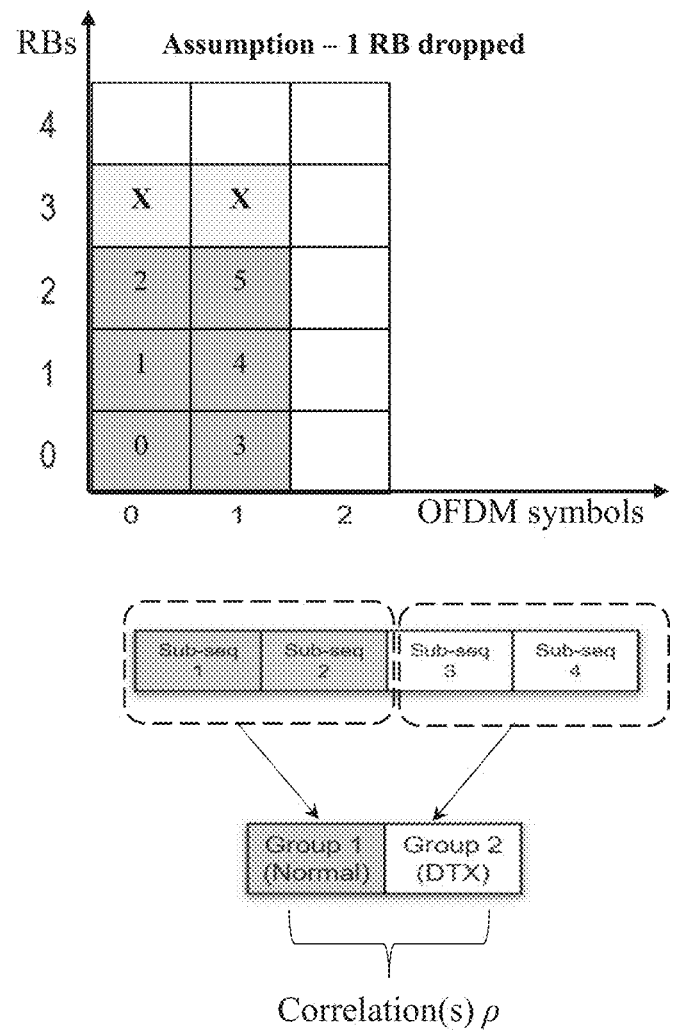
FIG. 16 illustrates the grouping and segmenting steps of the method of FIG. 14 with respect to the RE map of FIG. 7 where a first partial DTX state is assumed to have occurred.

In a step 415, a grouping step assumption is made where the grouping assumption is preferably based on an assumed condition derived from potential DTX scenarios. For example, the assumed condition may comprise a number of RBs assumed as not being validly used due to the occurrence of a partial DTX state. Preferably, the method 400 is applied iteratively starting with a lowest value of the assumed condition. Therefore, as illustrated by FIG. 16, the assumed condition may be that one RB has been dropped in the transmission of the linear block encoded signal with the next iteration illustrated by FIG. 17 where the assumed condition is that two RBs have been dropped in the transmission of the linear block encoded signal.

Once the grouping assumption is made, a grouping step 420 is performed to group the multiple sub-sequences 304 into sub-sequence groups 306. This may comprise grouping N-n sub-sequences into a first sub-sequence group and grouping a remaining n sub-sequences into a second sub-sequence group, where n is determined based on the number of RBs not used due to the occurrence of a partial DTX state.

In step 425, the resultant two sub-sequence groups 306 are each segmented into two 16-bit sequence segments 308.

In step 430, the correlation metrics 310 are calculated for each sequence segment 308 and, in step 435, DTX is set as equal to a value of "1" if any evaluation of the correlation metrics 310 results in any correlation metric 310 or any correlation metric product being found to be less than or equal to one or more selected, calculated or predetermined thresholds Th.

At decision box 440, a determination is made as to whether DTX=1. If the determination is the affirmative, then it is determined that a partial DTX state has occurred which is treated as a DTX state. As such, the processing of the received the linear block encoded signal is terminated without the need to perform the conventional steps of rate de-matching and decoding. If at decision box 440, the determination is negative them the method 400 passes to decision box 445 where a determination is made as to whether i is less than N−1. If yes, the in step 450, the value of i is incremented by 1 and the method 400 iterates to step 415. If at decision box 445 it is determined that i=N, then it is determined that the received the linear block encoded signal does not exhibit partial DTX and the received the linear block encoded signal continues with the conventional steps of rate de-matching and decoding to determine UCI bits for the received the linear block encoded signal.

FIG. 16 illustrates the steps 415 to 435 of method 400 of FIG. 15 where a first partial DTX state is assumed to have occurred such that if, any of the correlation metrics 310 or any of the correlation metric products is found to be less than or equal to the threshold Th, then another DTX assumption is implemented.

Figure 17:
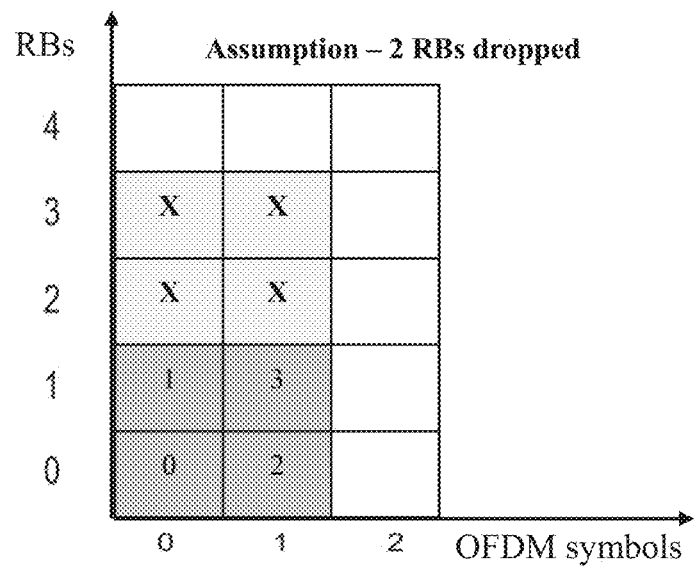
FIG. 17 illustrates the grouping and segmenting steps of the method of FIG. 14 with respect to the RE map of FIG. 9 where a second partial DTX state is assumed to have occurred.
Figure 17:
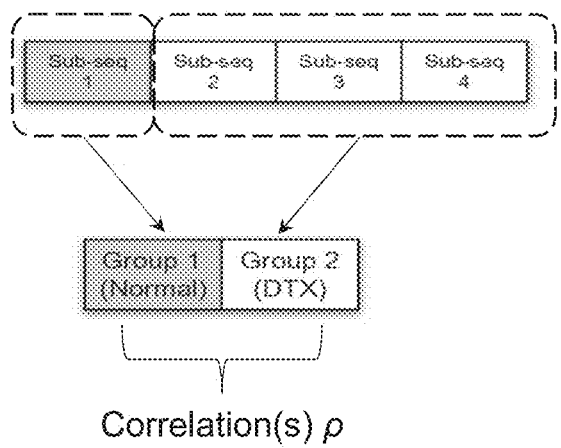

FIG. 17 illustrates the steps 415 to 435 of method 400 of FIG. 15 where a second partial DTX state is assumed to have occurred such that if, any of the correlation metrics 310 or any of the correlation metric products is found to be less than or equal to the threshold Th, then a determination is made as to whether the received the linear block encoded signal exhibits partial DTX or not.

Figure 18:
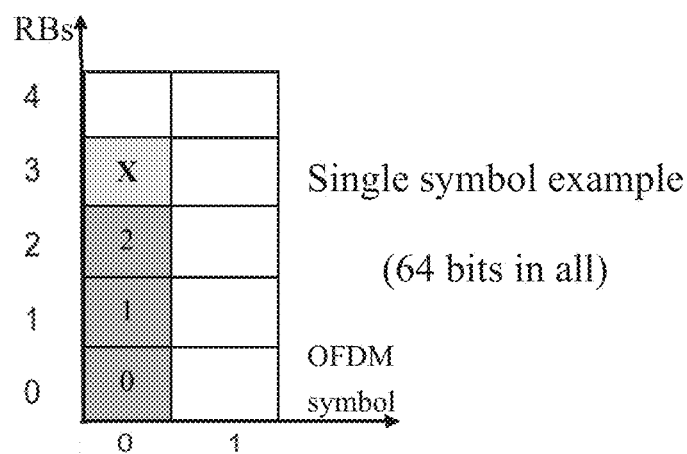
FIG. 18 illustrates the grouping and segmenting steps of the method of FIG. 14 with respect to a single symbol RE map.
Figure 18:
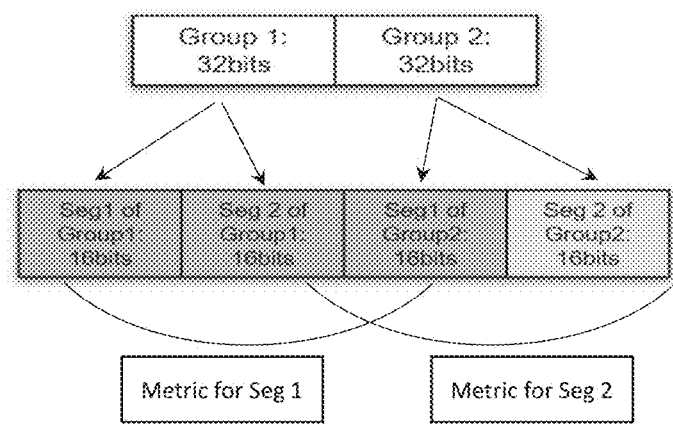

FIG. 18 illustrates the steps 415 to 435 of method 400 of FIG. 15 with respect to a single symbol RE map where a 32-bit sub-sequence (copy of the descrambled linear block encoded signal) is carried by two RBs and, if only one of the two RBs is DTX, then only half of the sub-sequence comprises noise. The segmenting step 425 of method 400 is especially useful for 1 symbol cases where the number of random soft bits is much smaller than for other scenarios.

In the method 400, it can be seen that the grouping step 420 may comprise grouping the multiple sub-sequences 304 into a predefined number of sub-sequence groups 306 where each of the sub-sequence groups 306 has one or multiple sequence segments 308.

In the above methods, the step of comparing one or more correlation metrics to one or more thresholds may be combined with other methods of determining the presence or existence of a DTX state or a partial DTX state.

The methods may include determining the presence or existence of a DTX state or a partial DTX state when any one of the following conditions is met: (i) all of the combined methods for determining the presence or existence of a DTX state or a partial DTX state indicate existence of a DTX state or a partial DTX state; (ii) at least one of the combined methods for determining the presence or existence of a DTX state or a partial DTX state indicate existence of a DTX state or a partial DTX state; or at least a predetermined number of the combined methods for determining the presence or existence of a DTX state or a partial DTX state indicate existence of a DTX state or a partial DTX state.

Referring again to FIG. 13, the following description is of the method of detecting a DTX state in accordance with the invention using bits reconstruction in step 208.

In a small block code encoder, 32 bit codewords $d_i$ are generated according to:

$$d_i = (\Sigma_{k=0}^{K-1} c_k \cdot M_{i,k}) \bmod 2$$

where the input comprises $c_k$ having k UCI payload bits and $3 \leq K \leq 11$;

M is the encoding matrix of size 32*11 in which all elements are "1" or "0".

An example of the encoding matrix M from the Table 5.3.3.3-1 of 3GPP Technical Specification 38.212 V15.13.0 is shown in FIG. 19.

Even using the sub-sequence correlation method first described above with respect to FIG. 13, it is difficult to detect partial DTX. However, the difficulty greatly increases in the situation where only one copy or less of the received linear block encoded signal is obtained. More specifically, in PUCCH Format 2 with only 1 OFDM symbol and only 2 RBs obtained, it is very difficult to differentiate partial DTX and, as a consequence, the BS scheduling may be compromised.

The preferred method to address this and other problems is to use bits reconstruction which provides a novel method of detecting partial DTX with a low false alarm rate (FAR) and a low missed detection rate (MDR). The method of detecting partial DTX using bits reconstruction can be implemented by the improved UCI receiver 100/200 of FIGS. 12 and 13 with suitable software modification.

The method of detecting partial DTX using bits reconstruction comprises receiving a linear block encoded signal on the UL at said UCI receiver 100/200 and processing the received linear block encoded signal after resource element (RE) demapping in a known manner to generate the soft bit sequence $\vec{s}$. The method includes selecting a plurality of bits in said generated soft bit sequence $\vec{r}$ as comparison bits. The selected comparison bits may comprise all the bits of the generated soft bit sequence $\vec{s}$ or preferably a subset of the bits of the generated soft bit sequence $\vec{s}$. More preferably, the subset of the bits of the generated soft bit sequence $\vec{s}$ starting with the $16^{th}$ bit of the 32-bit generated soft bit sequence $\vec{s}$ where a first bit of the generated soft bit sequence comprises the $0^{th}$ bit.

The generated soft bit sequence $\vec{s}$ from which the comparison bits are selected may comprise any one of: a soft bit sequence $\vec{s}$ generated by descrambling the received linear block encoded signal after RE demapping; a subset of the descrambled soft bit sequence $\vec{s}$ to provide a sub-sequence of the descrambled soft bit sequence $\vec{s}$; a subset of the sub-sequence of the descrambled soft bit sequence $\vec{s}$; a per bit sum or average of a plurality of sub-sequences of the descrambled soft bit sequence $\vec{s}$; and a subset of the per bit sum or average of a plurality of sub-sequences of the descrambled soft bit sequence $\vec{s}$.

In a next step of the bits reconstruction method, the selected comparison bits are compared to or correlated with corresponding bits in a reconstructed soft bit sequence $\vec{r}$. The reconstructed soft bit sequence $\vec{r}$ is first generated from a plurality of bits selected as reconstruction bits in said generated soft bit sequence $\vec{s}$. Preferably, the selected comparison bits and the selected reconstruction bits do not overlap in the generated soft bit sequence $\vec{s}$. The selected reconstruction bits are preferably selected from bits in a forward half of the generated soft bit sequence $\vec{s}$. These bits will contain a signal (not noise) even if a partial DTX state has occurred. In one embodiment, the selected reconstruction bits comprise the $1^{st}$ to $10^{th}$ bits of the generated soft bit sequence $\vec{s}$ where a first bit of the generated soft bit sequence $\vec{s}$ comprises the $0^{th}$ bit. It is preferred that the selected reconstruction bits never include the $0^{th}$ bit as the $0^{th}$ bit cannot be used with other bits such as the 1-$10^{th}$ bits to uniquely determine the whole codeword. The selected comparison bits are preferably selected from bits in a rearward half of the generated soft bit sequence $\vec{s}$. In one embodiment, the selected comparison bits comprise the $16^{th}$ to $31^{st}$ bits of the generated soft bit sequence $\vec{s}$. or a subset of the bits, or all the bits that are not used as reconstruction bits. These bits will comprise noise if a DTX state has occurred.

From the comparison of the selected comparison bits to the corresponding bits in the reconstructed soft bit sequencer $\vec{r}$, a comparison or correlation metric is determined, and a determination is made of whether a (partial) DTX state has occurred or not by evaluating the comparison or correlation metric.

Determining whether or not a (partial) DTX state has occurred by evaluating the comparison or correlation metric may comprise any one or more of: comparing signs of the selected comparison bits to signs of the corresponding bits in the reconstructed soft bit sequence $\vec{r}$ and, if the signs are all the same, determining that no DTX state has occurred; comparing signs of the selected comparison bits to signs of the corresponding bits in the reconstructed soft bit sequence $\vec{r}$ and, if a number of same signs is larger than a first same sign value threshold, determining that no DTX state has occurred; and determining a correlation value between the selected comparison bits and the corresponding bits in the reconstructed soft bit sequence $\vec{r}$ and, if the correlation value is larger than a first correlation value threshold, determining that no DTX state has occurred.

The method may also include selecting a plurality of bits in said generated soft bit sequence $\vec{s}$ as verification bits. All or most of the verification bits are preferably selected from a middle part of the generated soft bit sequence $\vec{s}$. These bits will contain a signal (not noise) even if a partial DTX state has occurred, while they cannot be used with other bits such as the 1-10$^{th}$ bits to uniquely determine the whole codeword, thus they are suitable for verifying whether the reconstruction is successful or not. However, it is preferred that the verification bits include the 0$^{th}$ bit. In one embodiment, the selected verification bits comprise the 0$^{th}$ bit and the 11$^{th}$ to 15$^{th}$ bits.

In one embodiment, the selected verification bits may include some or all the selected verification bits.

The method may include using the selected verification bits to verify the reconstruction of the reconstructed soft bit sequence $\vec{r}$ prior to comparing the selected comparison bits to the corresponding bits in the reconstructed soft bit sequence $\vec{r}$. If the verification is not valid, the method may include discontinuing the bits reconstruction DTX detection method and passing the linear block encoded signal to the rate de-matching module 212.

In one embodiment, the verification process may be an iterative process comprising (a) generating the reconstructed soft bit sequence $\vec{r}$ from the selected reconstruction bits, (b) verifying the reconstructed soft bit sequence $\vec{r}$ using the selected verification bits, and, if the verification is determined to be 'not valid', reversing signs of low confidence bits in a hard reconstruction bits vector $\vec{b}_h$ and then repeating at least step (a). A low confidence bit in the hard reconstruction bits vector $\vec{b}_h$ is a bit having a small magnitude in the reconstruction bits vector $\vec{b}$.

In the verification process, determining whether or not the verification is 'not valid' may comprise any one or more of: comparing signs of the selected verification bits with signs of the corresponding bits in the reconstructed soft bit sequence $\vec{r}$ and, if all signs are the same, continuing with the method of detecting DTX, i.e., determining that the verification is 'valid', comparing signs of the selected verification bits to signs of the corresponding bits in the reconstructed soft bit sequence $\vec{r}$ and, if a number of same signs is larger than a second (verification) same sign value threshold, continuing with the method of detecting DTX, and determining a correlation value between the selected verification bits and the corresponding bits in the reconstructed soft bit sequence $\vec{r}$ and, if the correlation value is larger than a second (verification) correlation value threshold, continuing with the method of detecting DTX.

Reconstructing the generated soft bit sequence $\vec{s}$ to provide the reconstructed soft bit sequence $\vec{r}$ includes transforming the selected reconstruction bits using a reconstruction matrix R. The reconstruction matrix R is obtained by selecting a square submatrix A from the input coding matrix M. Using only the 1$^{st}$ to 10$^{th}$ bits of the generated soft bit sequence $\vec{s}$ can uniquely determine the whole soft bits sequence. Therefore, it is preferred that the selected square submatrix A from the input coding matrix M comprises the 1-10$^{th}$ rows and 0-9$^{th}$ columns, namely: A=M$_{[1:10],[0:9]}$. The method includes obtaining an inverse matrix A$^{-1}$ from submatrix A then scaling the inverse matrix A$^{-1}$ by a selected or predetermined scaling factor, e.g., scaling factor=3. Finally, the method includes multiplying the scaled inverse matrix A$^{-1}$ by another selected but different submatrix of the input coding matrix M, e.g., M$_{[0, 11:31],[0:9]}$. Consequently, the reconstruction matrix R is obtained by: R=[scaling factor]·M$_{[0, 11:31],[0:9]}$A$^{-1}$ which is R=3M$_{[0, 11:31],[0:9]}$A$^{-1}$ when the scaling factor is 3. The another but different submatrix of the input coding matrix M may comprise M itself or the 0$^{th}$ and 11$^{th}$ last row and 0-9$^{th}$ columns of M, or a submatrix of the above two.

In one embodiment, the reconstruction matrix R is shown in FIG. 20.

R is fixed and therefore does not need to be computed online each time it is required. It can be computed off-line and then stored in the memory 140 of the UCI receiver 100/200 as a look-up table.

Figure 21:
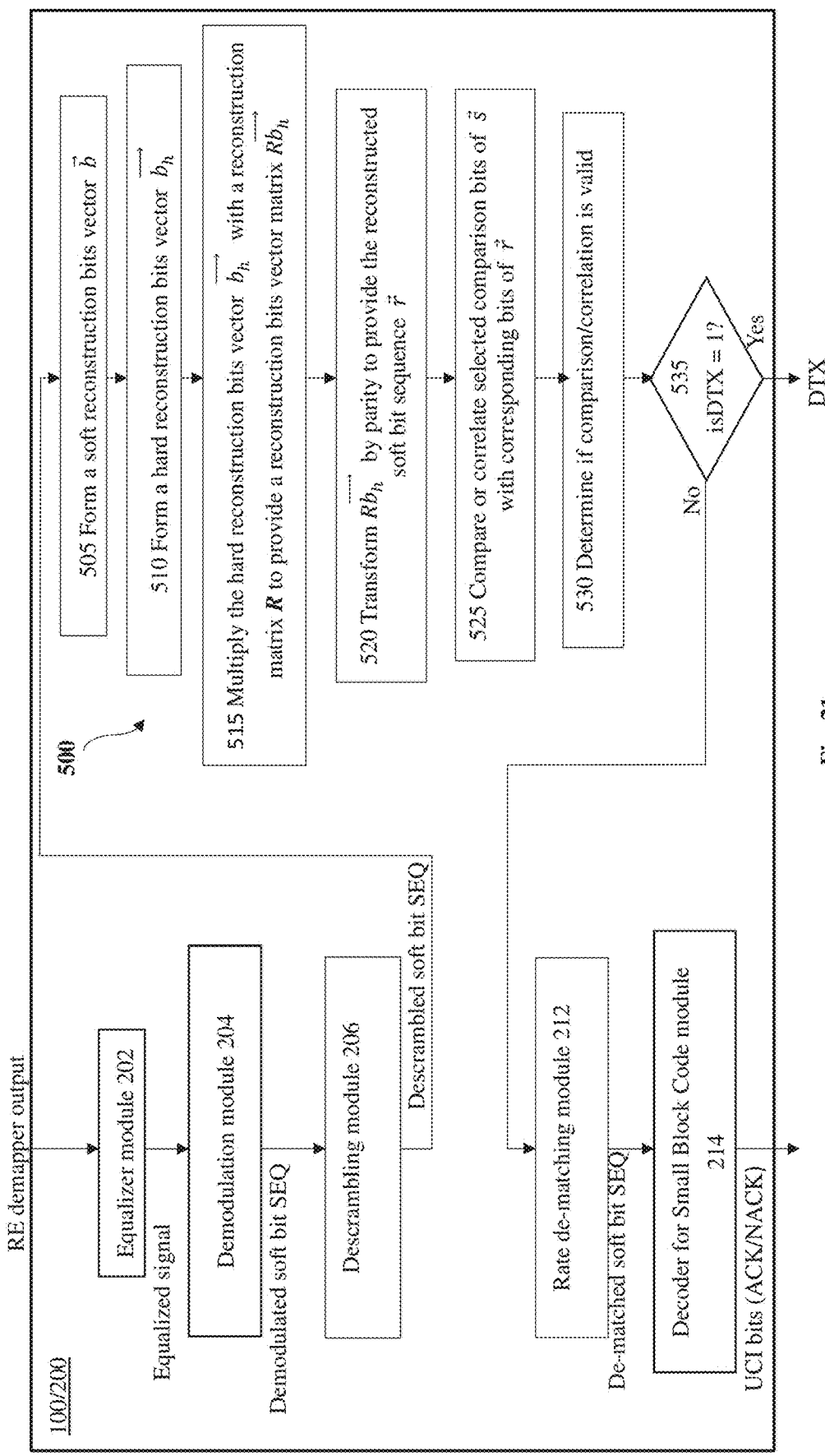
FIG. 21 is a schematic block diagram of the improved UCI receiver device in accordance with the invention showing the detailed steps of the bits reconstruction DTX detection method in accordance with the invention.

FIG. 21 is a schematic block diagram of the improved UCI receiver device 100/200 showing the steps of a preferred method 500 of generating the reconstructed soft bit sequence $\vec{r}$ and then using the reconstructed soft bit sequence $\vec{r}$ to determine if a DTX state has occurred.

The method 500 comprises a first step 505 using the selected reconstruction bits from the generated soft bit sequence $\vec{s}$ to form a soft reconstruction bits vector $\vec{b}$. The selected reconstruction bits from the generated soft bit sequence $\vec{s}$ can be obtained by accessing a look-up table in the memory 140 of the UCI receiver 100/200 because these can be computed as a once only process offline. In a next step 510, the soft bits of the reconstruction bits vector $\vec{b}$ are transformed to hard bits to form a hard reconstruction bits vector $\vec{b}_h$. The soft bits of the reconstruction bits vector $\vec{b}$ may be transformed to hard bits to form the hard reconstruction bits vector $\vec{b}_h$ by transforming positive soft bits of the reconstruction bits vector $\vec{b}$ to "0" and transforming negative soft bits of the reconstruction bits vector $\vec{b}$ to "1" or vice-versa. In a next step 515, the hard reconstruction bits vector $\vec{b}_h$ is multiplied with the reconstruction matrix R to provide a reconstruction bits vector matrix $R\vec{b}_h$.

Multiplying the hard reconstruction bits vector $\vec{b}_h$ with the reconstruction matrix R to provide the reconstruction bits vector matrix $R\vec{b}_h$ may include looking-up the reconstruction matrix R look-up table stored in the memory 140 of the UCI receiver 100/200 by index where the index is the vector or integer value represented by $\vec{b}_h$. The result of the multiplication of the hard reconstruction bits vector $\vec{b}_h$ with the reconstruction matrix R to provide the reconstruction bits vector matrix $R\vec{b}_h$ may itself be stored in the memory 140 as a look-up table and accessed later as a look-up operation as needed.

The method 500 includes the step 520 of transforming the bits of the reconstruction bits vector matrix $R\vec{b}_h$ to +/−bits by parity to provide the reconstructed soft bit sequence $\vec{r}$. Transforming the bits of the reconstruction bits vector matrix $R\vec{b}_h$ to +/−bits by parity to provide the reconstructed soft bit sequence $\vec{r}$ may comprise transforming odd value bits to "1" and even value bits to "−1" or vice-versa. In step 525, the selected comparison bits of $\vec{s}$ are compared or correlated with the corresponding bits of $\vec{r}$ to obtain a comparison or correlation metric. Step 530 comprises determining if the comparison or correlation metric is valid by evaluating the determined comparison or correlation metric in one of the ways hereinbefore described. In decision box 535, the method 500 outputs a DTX result if the comparison or correlation metric is non-valid and returns processing of the small block encoded signal to the rate de-matching module 212 if the comparison or correlation metric is valid.

Figure 22:
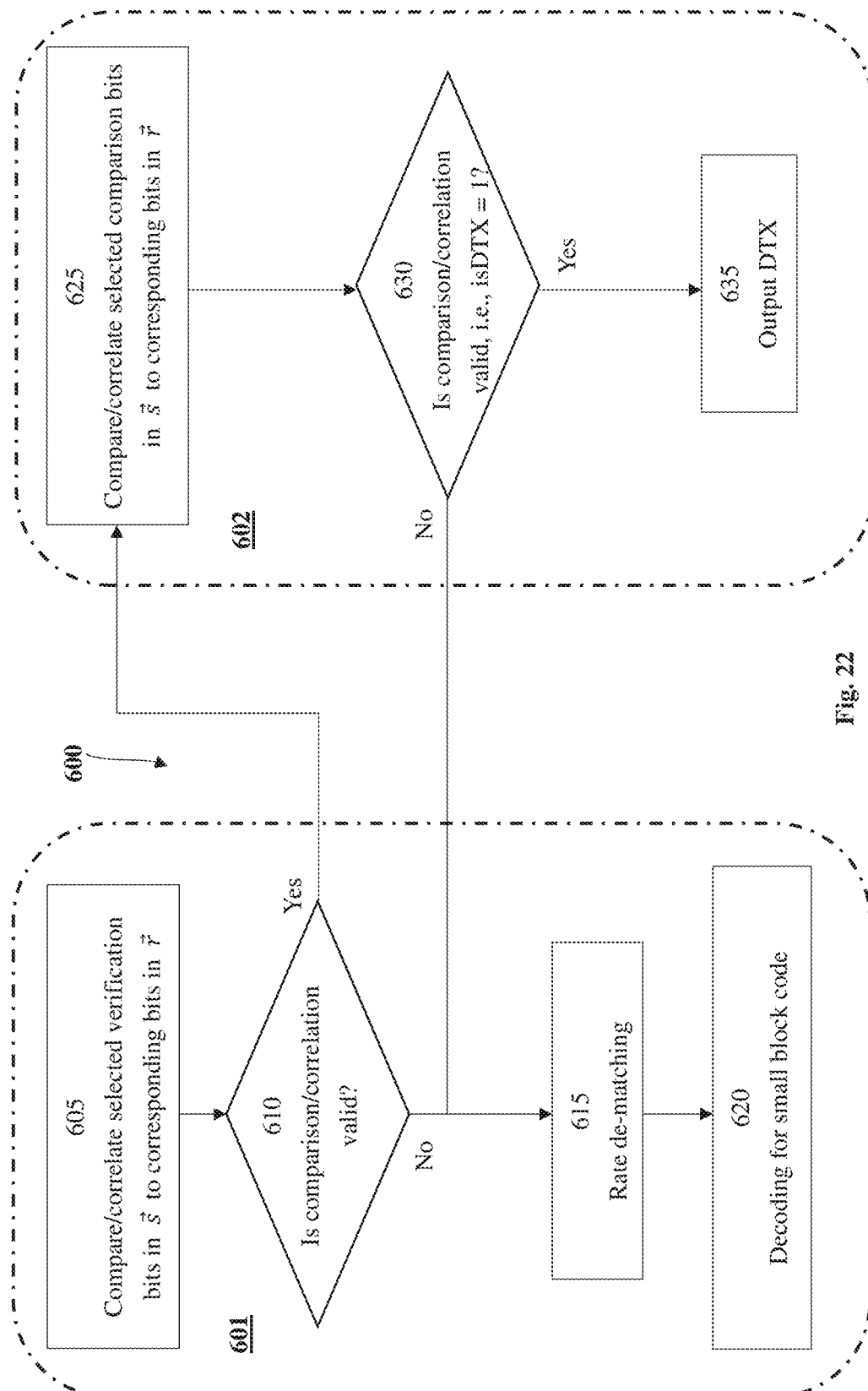
FIG. 22 is a flow diagram of the bits reconstruction DTX detection method in accordance with the invention including a verification process.

FIG. 22 illustrates a reconstruction bits DTX detection method 600 involving verification of the bits reconstruction process. The method 600 of FIG. 22 can replace steps 525 to 535 in the method 500 of FIG. 21. Dashed box 601 in FIG. 22 comprises the bits reconstruction verification process whereas dashed box 602 in FIG. 22 comprises the bits comparison/correlation process.

Once the reconstructed soft bit sequence $\vec{r}$ has been generated from the selected base or reconstruction bits of the generated soft bit sequence $\vec{s}$, a first step 605 of method 600 compares or correlates the selected verification bits from the generated soft bit sequence $\vec{s}$ with corresponding bits in the generated soft bit sequence $\vec{r}$. In a decision box 610, a determination of whether or not the verification of the correctness or integrity of the bits reconstruction result, namely the reconstructed soft bit sequence $\vec{r}$, can be based on any of the afore-described methods including, for example, comparing signs of the selected verification bits with signs of the corresponding bits in the reconstructed soft bit sequence f and, if all signs are the same, determining that the verification is valid. In the case where the determination at decision box 610 is that the verification is not valid, the small block encoded signal is passed in step 615 to the rate de-matching module 212 for rate de-matching in the known manner and then, in step 620, for small block decoding also in the known manner.

One advantage of the bits verification process being implemented prior to the bits comparison/correlation process is that, where the bits verification process returns a non-valid determination, the bit reconstruction method 602 need not be implemented.

Whilst the verification method 601 shows that, in the event of a non-valid verification determination, the small block encoded signal is passed in step 615 to the rate de-matching module 212 for rate de-matching, in some embodiments, an alternative DTX detection method may be implemented such as that first described with respect to FIGS. 13 to 18.

In the event that a determination is made at decision box 610 that the verification is valid, the small block encoded signal is passed to the bits comparison method 602 where, in step 625, the selected comparison bits of the generated soft bit sequence $\vec{s}$ are compared to or correlated with the corresponding bits of the reconstructed soft bit sequence $\vec{r}$. In a decision box 630, a determination of whether a (partial) DTX state has occurred or not through evaluation of the comparison/correlation metric. A determination can be based on any of the afore-described methods including, for example, comparing signs of the corresponding bits in the reconstructed soft bit sequence $\vec{r}$ and, if the signs are all the same, determining that no DTX state has occurred.

In the case where the determination at decision box 630 is that no DTX state has occurred, the small block encoded signal is passed to the rate de-matching module 212 for rate de-matching in step 615 in the known manner and then, in step 620, for small block decoding also in the known manner. In the case where the determination at decision box 630 is that a DTX state has occurred, the UCI receiver 100/200 declares or outputs a DTX state and terminates processing of the small block encoded signal.

In one example of the bit reconstruction DTX detection method 602, it is preferred to determine a correlation value between the selected comparison bits the generated soft bit sequence $\vec{s}$ and the corresponding bits in the reconstructed soft bit sequence $\vec{r}$. The correlation metric value ρ is derived from:

$$\rho = \frac{\dot{s}\cdot\dot{r}}{\|\dot{s}\|\,\|\dot{r}\|}$$

where ṡ/ṙ are the comparison bits;
$\|\dot{s}\|$ is the magnitude of ṡ; and
$\|\dot{r}\|$ is the magnitude of ṙ.

The correlation metric value ρ is compared to a first correlation value threshold:

$\rho \leq th_c$

If the correlation value ρ is larger than the first correlation value threshold $th_c$, then is it determined that no DTX state has occurred. If the correlation value ρ is less than or equal to the first correlation value threshold $th_c$, then is it determined that a DTX state has occurred. The first correlation value threshold $th_c$ is a predefined threshold value.

As previously indicated, the reconstruction bit DTX detection method of the invention can be improved by including some or all the verification bits as comparison bits.

Having selected a plurality of comparison bits, it is possible to implement the reconstruction bit DTX detection method of the invention using a subset of the selected comparison bits.

The reconstruction bits DTX detection method can be implemented in combination with other DTX detection methods including, by way of example, the sub-sequence correlation method first described with reference to FIGS. 13 to 18. Assuming therefore that the number of all DTX detection methods being implemented comprises 2 or more and is represented by "Num" then denote a method number threshold Num_th. If a number $Num_{DTX}$ of implemented DTX detection methods which declare occurrence of a (partial) DTX state according to $Num_{DTX} \geq Num\_th$, where $1 \leq Num\_th \leq Num$ then declare that a DTX state has occurred, otherwise process the small block encoded signal as normal.

The linear block code may be Reed-Muller (RM) code or RM-based super code.

The invention provides a UCI receiver device 100 for a wireless communication system. The UCI receiver device 100 comprises a memory 140 storing machine-readable instructions and a processor 150 for executing the machine-readable instructions such that, when the processor 150 executes the machine-readable instructions, it configures the UCI receiver device 100 to implement the afore-described methods in accordance with the invention.

The invention provides a non-transitory computer-readable medium 140 storing machine-readable instructions, wherein, when the machine-readable instructions are executed by a processor 150, they configure the processor 150 to implement the afore-described methods in accordance with the invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture"

typically in the form of executable code and/or associated data that is carried on or embodied in a type of machine-readable medium. "Storage" type media include any or all the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of detecting a full or partial discontinuous transmission state (DTX) at an uplink control information (UCI) receiver in a wireless communication system, the method comprising:
  receiving a linear block encoded signal on an uplink (UL) at said UCI receiver;
  processing the received linear block encoded signal after resource element (RE) demapping to generate a soft bit sequence;
  selecting a plurality of bits in said generated soft bit sequence as reconstruction bits;
  generating reconstructed soft bits using the plurality of reconstruction bits to form a reconstructed soft bit sequence;
  selecting a plurality of bits in said generated soft bit sequence as comparison bits, where the selected comparison bits and the selected reconstruction bits do not overlap;
  comparing said selected comparison bits to corresponding bits in the reconstructed soft bit sequence;
  determining a comparison or correlation metric between the selected comparison bits and the corresponding bits in the reconstructed soft bit sequence; and
  determining if a full or partial DTX state has occurred by evaluating the determined comparison or correlation metric.

2. The method of claim 1, wherein the step of determining if a full or partial DTX state has occurred comprises any one or more of:
  comparing signs of the selected comparison bits to signs of the corresponding bits in the reconstructed soft bit sequence and, if the signs are all the same, determining that no DTX state has occurred;
  comparing signs of the selected comparison bits to signs of the corresponding bits in the reconstructed soft bit sequence and, if a number of same signs is larger than a first same sign value threshold, determining that no DTX state has occurred; and
  determining a correlation value between the selected comparison bits and the corresponding bits in the reconstructed soft bit sequence and, if the correlation value is larger than a first correlation value threshold, determining that no DTX state has occurred.

3. The method of claim 1, wherein the generated soft bit sequence comprises any one of: a soft bit sequence generated by descrambling the received linear block encoded signal after resource element (RE) demapping; a subset of a descrambled soft bit sequence to provide a sub-sequence of the descrambled soft bit sequence; a subset of the sub-sequence of the descrambled soft bit sequence; a per bit sum or average of a plurality of sub-sequences of the descrambled soft bit sequence; and a subset of the per bit sum or average of a plurality of sub-sequences of the descrambled soft bit sequence.

4. The method of claim 1, wherein the plurality of bits selected in said generated soft bit sequence $\vec{s}$ as reconstruction bits comprise bits located in a forward half of the generated soft bit sequence $\vec{s}$ and/or the plurality of bits selected in said generated soft bit sequence as comparison bits comprise bits located in a rearward half of the generated soft bit sequence.

5. The method of claim 1, wherein the selected reconstruction bits comprise the $1^{st}$ to $10^{th}$ bits of the generated soft bit sequence where a first bit of the generated soft bit sequence comprises the $0^{th}$ bit.

6. The method of claim 1, wherein the selected comparison bits comprise any one of: a subset of the bits of the generated soft bit sequence; a subset of the bits of the generated soft bit sequence starting with the $16^{th}$ bit of the generated soft bit sequence where a first bit of the generated soft bit sequence comprises the $0^{th}$ bit; or all the bits of the generated soft bit sequence that are not used as reconstruction bits.

7. The method of claim 1, wherein the method includes:
  selecting a plurality of bits in said generated soft bit sequence as verification bits;
  comparing said selected verification bits of the generated soft bit sequence with corresponding bits in the reconstructed soft bit sequence; and determining from the comparison of said selected verification bits of the generated soft bit sequence with corresponding bits in the reconstructed soft bit sequence whether or not to discontinue the method of detecting DTX.

8. The method of claim 7, wherein the step of comparing said selected verification bits of the generated soft bit sequence[$-\vec{s}$] with the corresponding bits in the reconstructed soft bit sequence comprises any one or more of:
comparing signs of the selected verification bits with signs of the corresponding bits in the reconstructed soft bit sequence and, if all signs are the same, continuing with the method of detecting DTX;
comparing signs of the selected verification bits to signs of the corresponding bits in the reconstructed soft bit sequence and, if a number of same signs is larger than a second same sign value threshold, continuing with the method of detecting DTX; and
determining a correlation value between the selected verification bits and the corresponding bits in the reconstructed soft bit sequence and, if the correlation value is larger than a second correlation value threshold, continuing with the method of detecting DTX.

9. The method of claim 7, wherein the verification bits include some or all of the selected verification bits and/or the selected verification bits comprise the $0^{th}$ and $11^{th}$ to $16^{th}$ bits of the generated soft bit sequence where a first bit of the generated soft bit sequence comprises the $0^{th}$ bit and/or the selected verification bits comprise a subset of the bits in a forward half of the generated soft bit sequence.

10. The method of claim 1, wherein reconstructing the generated soft bit sequence[$-\vec{s}$] to provide the reconstructed soft bit sequence[$-\vec{r}$] includes transforming the selected reconstruction bits using a reconstruction matrix obtained by:
selecting square submatrix comprising the $1-10^{th}$ rows and $0-9^{th}$ columns of an input coding matrix;
obtaining an inverse matrix from the square submatrix;
scaling the inverse matrix by a selected or predetermined scaling factor; and
multiplying the scaled inverse matrix by a same or another submatrix of the input coding matrix.

11. The method of claim 10, wherein obtaining the reconstruction matrix is a one-off operation and a resultant reconstruction matrix is stored in memory as a look-up table.

12. The method of claim 10, wherein reconstructing the generated soft bit sequence to provide the reconstructed soft bit sequence comprises:
using the selected reconstruction bits from the generated soft bit sequence to form a soft reconstruction bits vector;
transforming soft bits of the reconstruction bits vector to hard bits to form a hard reconstruction bits vector;
multiplying the hard reconstruction bits vector with the reconstruction matrix to provide a reconstruction bits vector matrix; and
transforming bits of the reconstruction bits vector matrix to +/−bits by parity to provide the reconstructed soft bit sequence.

13. The method of claim 12, wherein obtaining the reconstruction matrix is a one-off operation and a product of the reconstruction matrix with all possible combinations of the hard reconstruction bits vector is stored in memory as a look-up table; and the method includes any one or more of the following:
transforming the soft bits of the reconstruction bits vector to hard bits to form the hard reconstruction bits vector by transforming positive soft bits of the reconstruction bits vector to "0" and transforming negative soft bits of the reconstruction bits vector to "1" or vice-versa;
multiplying the hard reconstruction bits vector with the reconstruction matrix to provide the reconstruction bits vector matrix includes accessing the look-up table stored in memory by index where the index is the vector or integer value represented by; and
transforming bits of the reconstruction bits vector matrix to +/−bits by parity to provide the reconstructed soft bit sequence by transforming odd value bits to "1" and even value bits to "−1" or vice-versa.

14. The method of claim 13, wherein generating the reconstructed soft bit sequence from the plurality of bits selected as reconstruction bits in said generated soft bit sequence comprises an iterative process of:
(a) generating the reconstructed soft bit sequence $\vec{r}$ from the selected reconstruction bits; and
(b) verifying the reconstructed soft bit sequence using a plurality of verification bits selected from said generated soft bit sequence[$-\vec{s}$];
(c) if the verification is not valid, reversing signs of low confidence bits in the hard reconstruction bits vector; and
(d) repeating at least step (a).

15. The method of claim 14, wherein a low confidence bit in the hard reconstruction bits vector is a bit having a small magnitude in the reconstruction bits vector.

16. The method of claim 1, wherein the method is combined with other methods of detecting a DTX state.

17. A method of processing a linear block encoded signal at an uplink control information (UCI) receiver in a wireless communication system, the method comprising:
receiving the linear block encoded signal on an uplink (UL) at said UCI receiver;
processing the received linear block encoded signal after resource element (RE) demapping to generate a soft bit sequence;
selecting a plurality of bits in said generated soft bit sequence as reconstruction bits;
generating reconstructed soft bits using the plurality of reconstruction bits to form a reconstructed soft bit sequence;
selecting a plurality of bits in said generated soft bit sequence as verification bits;
comparing said selected verification bits of the generated soft bit sequence to corresponding bits in the reconstructed soft bit sequence;
determining from the comparison of said selected verification bits of the generated soft bit sequence with the corresponding bits in the reconstructed soft bit sequence to compare a plurality of selected comparison bits of said generated soft bit sequence with corresponding bits in the reconstructed soft bit sequence, where the selected comparison bits and the selected reconstruction bits do not overlap;
comparing said selected comparison bits to the corresponding bits in the reconstructed soft bit sequence;
determining a comparison or correlation metric between the selected comparison bits and the corresponding bits in the reconstructed soft bit sequence; and
determining if a full or partial DTX state has occurred by evaluating the determined comparison or correlation metric.

18. An uplink control information (UCI) receiver in a wireless communication system, the UCI receiver comprising:
- a memory storing machine-readable instructions; and
- a processor for executing the machine-readable instructions such that, when the processor executes the machine-readable instructions, it configures the UCI receiver to:
- receive a linear block encoded signal on an uplink (UL) at said UCI receiver;
- process the received linear block encoded signal after resource element (RE) demapping to generate a soft bit sequence;
- select a plurality of bits in said generated soft bit sequence as reconstruction bits;
- generate reconstructed soft bits using the plurality of reconstruction bits to form a reconstructed soft bit sequence;
- select a plurality of bits in said generated soft bit sequence as comparison bits, where the selected comparison bits and the selected reconstruction bits do not overlap;
- compare said selected comparison bits to corresponding bits in the reconstructed soft bit sequence;
- determine a comparison or correlation metric between the selected comparison bits and the corresponding bits in the reconstructed soft bit sequence; and
- determine if a full or partial DTX state has occurred by evaluating the determined comparison or correlation metric.

\* \* \* \* \*